US012677808B2

(12) United States Patent
Timmons et al.

(10) Patent No.: US 12,677,808 B2
(45) Date of Patent: Jul. 14, 2026

(54) RECIRCULATING AQUACULTURE MIXED-CELL RACEWAY SYSTEM

(71) Applicants: Michael Ben Timmons, Vero Beach, FL (US); Robert Edmund Abend, Bowling Green, KY (US)

(72) Inventors: Michael Ben Timmons, Vero Beach, FL (US); Robert Edmund Abend, Bowling Green, KY (US)

( * ) Notice: Subject to any disclaimer, the term of this patent is extended or adjusted under 35 U.S.C. 154(b) by 0 days.

(21) Appl. No.: 19/071,099

(22) Filed: Mar. 5, 2025

(65) Prior Publication Data

US 2025/0280802 A1 Sep. 11, 2025

Related U.S. Application Data

(60) Provisional application No. 63/561,713, filed on Mar. 5, 2024.

(51) Int. Cl.
*A01K 63/00* (2017.01)
*A01K 61/10* (2017.01)
(Continued)

(52) U.S. Cl.
CPC ............ *A01K 63/003* (2013.01); *A01K 61/10* (2017.01); *A01K 63/042* (2013.01); *A01K 63/045* (2013.01); *A01K 63/047* (2013.01); *C02F 1/001* (2013.01); *C02F 1/20* (2013.01); *C02F 3/08* (2013.01); *C02F 3/16* (2013.01); *C02F 2101/16* (2013.01); *C02F 2103/20* (2013.01)

(58) Field of Classification Search
CPC .. A01K 63/003; A01K 63/042; A01K 63/045; A01K 63/047; A01K 61/10; A01G 31/021; A01G 31/02; A01G 31/00; A01G 31/06

USPC .......................................................... 119/259
See application file for complete search history.

(56) References Cited

U.S. PATENT DOCUMENTS 3,434,598 A * 3/1969 Daman ................. C02F 3/1242
210/219
3,796,414 A * 3/1974 Winton .................... C02F 3/165
210/197

(Continued)

FOREIGN PATENT DOCUMENTS

WO WO-9407361 A1 * 4/1994 ............. A01K 63/04
WO WO-2016077928 A1 * 5/2016 ........... A01K 63/045

*Primary Examiner* — Zoe Tam Tran

(57) ABSTRACT

A recirculating aquaculture Mixed-Cell Raceway (MCR) system enables the implementation of a compact commercial-size fish culturing system in long and narrow agricultural-style buildings commonly used to house and grow animals. The system can be retrofitted to existing agricultural-style buildings or in new constructions. The system is entirely contained within the footprint of a single rectangular MCR. The MCR can be divided into several growth cells equal in width and length. One or more growth cells are dedicated to water quality treatment and pumping. Each growth cell follows diameter-to-depth ratio guidelines previously developed for round tanks to quickly force the removal of solids being generated because of the feeding fish being cultured. All growth cells are in alignment, co-planar, and all the functions are integrated into the MCR's footprint. Minimal disturbance to the building is necessary, and existing utilities are reused so that plumbing, electrical infrastructure, and construction costs are reduced.

18 Claims, 21 Drawing Sheets

(51) Int. Cl.

| | |
|---|---|
| *A01K 63/04* | (2006.01) |
| *C02F 1/00* | (2023.01) |
| *C02F 1/20* | (2023.01) |
| *C02F 3/08* | (2023.01) |
| *C02F 3/16* | (2023.01) |
| *C02F 101/16* | (2006.01) |
| *C02F 103/20* | (2006.01) |

(56)                   References Cited

U.S. PATENT DOCUMENTS

| | | | | |
|---|---|---|---|---|
| 5,469,810 A | * | 11/1995 | Chiang | A01K 63/003 |
| | | | | 119/248 |
| 2005/0081794 A1 | * | 4/2005 | Lin | A01K 61/10 |
| | | | | 119/225 |
| 2008/0251028 A1 | * | 10/2008 | Grad | A01K 63/045 |
| | | | | 119/248 |
| 2013/0206077 A1 | * | 8/2013 | Castranova | A01K 1/03 |
| | | | | 119/248 |
| 2016/0362322 A1 | * | 12/2016 | Kuo | A01K 63/00 |
| 2022/0142126 A1 | * | 5/2022 | Holder | C02F 3/14 |
| 2023/0200359 A1 | * | 6/2023 | Russek | A01K 63/042 |
| | | | | 119/263 |
| 2025/0366448 A1 | * | 12/2025 | Kemp | A01K 63/042 |

* cited by examiner

RECIRCULATING AQUACULTURE MIXED-CELL RACEWAY SYSTEM

The current application claims a priority to the U.S. Provisional Patent application Ser. No. 63/561,713 filed on Mar. 5, 2024.

FIELD OF THE INVENTION

The present invention generally relates to aquaculture growth systems. More specifically, the present invention discloses an integrated, inline, co-planar mixed-cell raceway fish rearing system that is suitable for retrofit to existing former poultry and swine agricultural-style buildings or industrial buildings.

BACKGROUND OF THE INVENTION

Many farms in rural United States have long narrow buildings that were built specifically to house and rear poultry and swine. The specifications of these buildings are dictated by the integrated poultry or swine business companies (referred to as integrators) that the farmers choose to enter into a contract to grow animals for the integrator. The integrator also typically supplies the farmers with the animals such as chicks, poults, or piglets, as well as the necessary feed, and then collects the live animals for processing and marketing. Unfortunately, agricultural-style buildings age and become obsolete over time since the integrator often requires the farmer to make upgrades to the buildings. In addition, the farmer may lose the integrator's contract for a variety of reasons. Abandoned buildings frequently have no alternate use and sit by idly to deteriorate with no means of generating income for the farmer due to various circumstances. Moreover, farmers who have installed agricultural-style buildings face the costly upgrades over time, and the ones who do not perform constant upgrades face not receiving new flocks as often as farmers or agricultural-style buildings that are performing at a higher level for the integrator.

Repurposing agricultural-style buildings can give the farmer a means to generate revenue if the new use falls within the scope and general knowledge base of farming operations. Reusing agricultural-style buildings saves investment costs as the existing buildings provide adequate shelter, already have access to water and electricity, access to semi-skilled labor, and access to farmland for utilization of waste for soil amendment and improvement. All these existing features reduces the cost of investment and improves the profitability and return on invested capital of the farm. For example, an aquaculture growth system could be implemented on the existing unused buildings. The problem in applying an aquaculture growth system to agricultural-style buildings is that conventional aquaculture fish farm systems are too complex and expensive to allow the farmer to operate at an attractive rate of profitability. Current systems have required complex plumbing and expensive water treatment equipment that are difficult to operate and are generally beyond the ability of small-scale farmers to construct and operate profitably. Therefore, a recirculating aquaculture mixed-cell raceway system that can be retrofitted to existing unused agricultural-style buildings in a simplistic manner is necessary and beneficial.

SUMMARY OF THE INVENTION

The present invention discloses a recirculating aquaculture Mixed-Cell Raceway (MCR) system. The system of the present invention is designed to easily fit into long narrow agricultural-style buildings with minimal disruption to existing floors and structures. The present invention's system is also designed to take advantage of existing water, electricity, waste systems, and other infrastructure already present at the farm site. Further, the present invention's system is designed to collect all functions of water treatment including, but not limited to, Carbon Dioxide (CO2) stripping, oxygenation, biofiltration, mechanical filtration, and pumping within the envelope of the MCR, specifically within a water treatment section.

The water treatment section of the present invention is generally at one end of the MCR and is about 25% of the volume of the total MCR (e.g., a 6-growth cell unit would have one or more cells for water treatment), and the water treatment section volume is proportional to the feed loading of the fish growth cells. Further, water preferably moves out of the fish-containing growth cells in two different pathways:

1) A majority of the waterflow moves under force of gravity from the fish-containing growth cells to the treatment section. The treatment section includes three functional treatment reservoirs fluidly connected to each other through progressively lower weirs until the waterflow reaches lifting pumps in a pumping reservoir. The lifting pumps then re-elevate and distribute the filtered waterflow back to each of the fish-containing growth cells, to repeat this process continually.

2) A minority of the waterflow moves through center drains of each fish-containing growth cells. Solids are collected at the center drains by the rotation of the waterflow in each fish-containing growth cells. The waterflow then moves through center drain pipes to a side channel or pipe which conveys the waterflow to a solids removal device. The solids removal device collects and removes the solid waste from the water flow. Then, the filtered waterflow is expelled into the pumping reservoir where the filtered waterflow can be reunited with the majority of the waterflow.

Further, the treatment section is preferably located at one end of the MCR; however, the water treatment section or additional treatment sections can be located at any position along the MCR. For example, the water treatment section can be positioned among the fish-containing growth cells. The particular chosen position can be decided based on the needs of the fish species, the specific husbandry process of the farming operation, the specifics of the design of the existing barn, or the bias of the farmer operator.

Further, the present invention's system can be designed to house a single cohort of fish (no barriers between the virtual cells) or segregate and house multiple cohorts (ages) of fish simultaneously. Several water dividing gates between the cohorts can be utilized to segregate the multiple cohorts and to hydraulically isolate the final stage (pre-shipment) of growth just before delivery to harvesting in a process known as purging. Purging is the process where common system water is excluded from one or more growth cells and new water is added to remove any off flavors the fish may possess. As handling fish causes the fish to stress and to slow the growth, the present invention's system allows the farmer to never have to handle the fish during their growth period and subsequent purging period, saving the farmer's labor and time and minimizing stress to the fish.

DETAIL DESCRIPTIONS OF THE INVENTION

All illustrations of the drawings are for the purpose of describing selected versions of the present invention and are not intended to limit the scope of the present invention.

Figure 21:
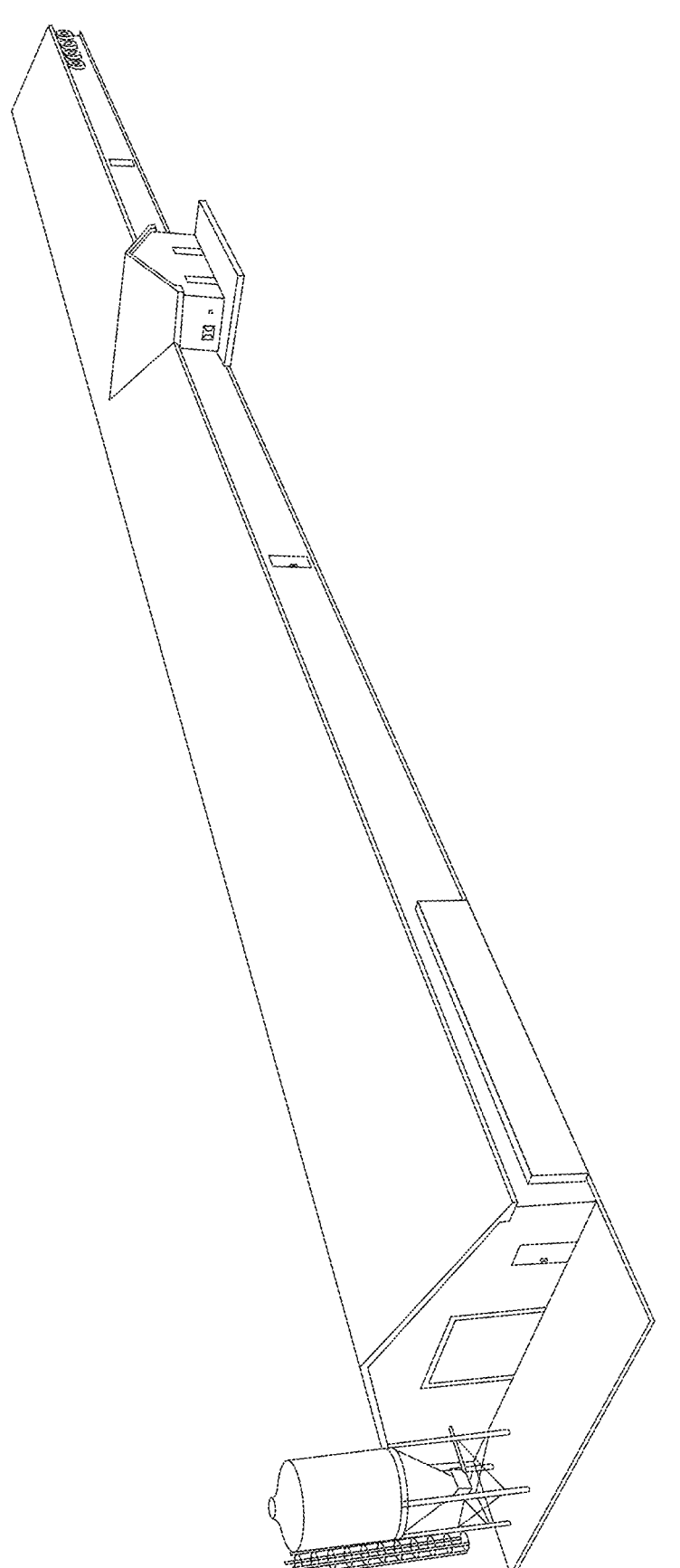
FIG. 21 is a top perspective view of a long and narrow agricultural-style building that can be retrofitted with the present invention's system.

The present invention discloses a recirculating aquaculture Mixed-Cell Raceway (MCR) system. The present invention's system enables the implementation of a simplified, inline, recirculating, MCR in long and narrow agricultural-style buildings with minimal disruption to the existing building's floors and structure, as can be seen in FIG. 21. In addition, the present invention's system allows the utilization of existing water, electricity, and waste systems found in the target building. The present invention's system is not restricted to existing agricultural-style buildings, other suitable existing or newly constructed buildings can be utilized. As can be seen in FIGS. 1, 4, and 17 through 20, in the preferred embodiment, the present invention comprises at least one MCR 1 and a drain system 34, as can be seen in FIG. 1 through 7. The at least one MCR 1 corresponds to an integrated structure that houses all subsystems of the present invention's system that facilitate the growth of the target aquatic organisms. The at least one MCR 1 also enables the necessary flow through the system that facilitates the filtration of the waterflow. Further, the drain system 34 enables secondary flow that removes solid waste from the waterflow.

The general configuration of the aforementioned components enables farmers to repurpose unused buildings to grow different aquatic organisms in a cost-effective manner. As can be seen in FIGS. 1, 4, and 13 through 20, the at least one MCR 1 is designed to house all necessary subsystems that facilitate the growth of the target aquatic organisms with minimal handling. As can be seen in FIG. 4 through 10, the at least one MCR 1 comprises at least one aquaculture growth section 2, a water treatment section 14, and a water return system 30. The at least one aquaculture growth section 2 corresponds to the section of the at least one MCR 1 where the target aquatic organisms grow. The water treatment section 14 corresponds to the section that performs several water treatment processes to ensure the healthy growth of the target aquatic organisms. So, the water treatment section 14 comprises a first Static Bed Filter (SBF) reservoir 15, a Moving bed biofilter reactor (MBBR) reservoir 23, and a pumping reservoir 26. The first SBF reservoir 15 enables the removal of suspended particles and contaminants from the waterflow. The MBBR reservoir 23 enables the performance of different water treatment functions including, but not limited to, oxygenation, Carbon Dioxide ($CO_2$) removal, organic carbon removal, nitrification, etc. The pumping reservoir 26 corresponds to the structure that temporarily retains the treated water that is moved back to the at least one aquaculture growth section 2 via the water return system 30. The water return system 30 enables the flow of the treated water from the water treatment section 14 to the at least one aquaculture growth section 2 to form a closed continuous waterflow loop.

In the preferred embodiment, the present invention can be implemented as follows: the at least one aquaculture growth section 2 is positioned adjacent to the water treatment section 14 to maintain both sections contained within the at least one MCR 1, as can be seen in FIGS. 1, 4, and 13 through 20. In addition, the at least one aquaculture growth section 2 and the water treatment section 14 are positioned coplanar with each other to eliminate the need for modifications to the existing building's floor. Further, the at least one aquaculture growth section 2, the first SBF reservoir 15, the MBBR reservoir 23, and the pumping reservoir 26 are in fluid communication with each other so that waterflow is enabled through the different sections of the at least one MCR 1. In other words, water can flow from the at least one aquaculture growth section 2, through the first SBF reservoir 15 and the MBBR reservoir 23, and into the pumping reservoir 26. Further, the at least one aquaculture growth section 2 is in fluid communication with the pumping reservoir 26 via the drain system 34 so a secondary waterflow pathway is formed from the at least one aquaculture growth section 2 to the pumping reservoir 26. Furthermore, the pumping reservoir 26 is in fluid communication with the at least one aquaculture growth section 2 via the water return system 30 to enable the return of treated water back into the at least one aquaculture growth section 2. Thus, a closed waterflow loop is established that enables the continuous treatment of water in the at least one MCR 1 to promote the healthy growth of the target aquatic organisms.

As previously discussed, the drain system 34 enables the flow of untreated water from the at least one aquaculture growth section 2 to the pumping reservoir 26. In addition, the drain system 34 enables the removal of solid waste from the untreated water before the waterflow moves into the pumping reservoir 26. As can be seen in FIGS. 1 through 10 and 13 through 20, the at least one aquaculture growth section 2 may comprise at least one growth cell 3. The at least one growth cell 3 corresponds to a subdivision inside the at least one aquaculture growth section 2 that retains the target aquatic organism during the growth phase. The at least one growth cell 3 is preferably a rectangular shaped structure with an open top. So, the at least one growth cell 3 generally comprises a cell opening 4 and a cell floor 5. In addition, the drain system 34 comprises at least one gravity-assisted drain 35, a drain conduit 36, and a filtration reservoir 37. The at least one gravity-assisted drain 35 corresponds to a structure on the at least one growth cell 3 that allows the draining of the untreated water via gravity towards the water treatment section 14. The drain conduit 36 corresponds to a flow mechanism that allows the flow of untreated water from the at least one growth cell 3 to the filtration reservoir 37. The filtration reservoir 37 is designed to remove solid waste from the untreated waterflow before moving into the pumping reservoir 26.

In the preferred embodiment, the drain system 34 can be implemented as follows: the drain conduit 36 is positioned external to the at least one mixed-cell raceway, as can be seen in FIGS. 1 through 10 and 13 through 20. The drain conduit 36 is preferably a structure separate from the at least one MCR 1. For example, the drain conduit 36 can be an elongated channel that spans the length of the at least one MCR 1 to guide the untreated waterflow from the at least one growth cell 3 to the pumping reservoir 26. Further, the at least one gravity-assisted drain 35 is centered on the cell floor 5. Since the flow of water in the at least one growth cell 3 is preferably rotating in the clockwise or counterclockwise direction, solid waste is guided towards the center of the cell floor 5 so that the solid waste is collected by the at least one gravity-assisted drain 35. Further, the at least one gravity-assisted drain 35 is integrated into the cell floor 5 to secure the at least one gravity-assisted drain 35 to the cell floor 5. The at least one gravity-assisted drain 35 is also in fluid communication with the filtration reservoir 37 via the drain conduit 36. For example, the at least one gravity-assisted drain 35 can be implemented on a drain hole on the cell floor 5 and is designed to enable the flow of water and small solid waste out of the at least one growth cell 3. The at least one gravity-assisted drain 35 also prevents the growing aquatic organisms from exiting the at least one growth cell 3. Further, the at least one gravity-assisted drain 35 can be connected to the drain conduit 36 via the appropriate tubing that is installed below the cell floor 5. Alternatively, the at least one gravity-assisted drain 35 can be provided as a pipe installed above the cell floor 5 which would syphon out water from the center drain area. A syphon-type drain is often used so that no holes are made in the floor of the at least one MCR 1. Furthermore, the filtration reservoir 37 is in fluid communication with the pumping reservoir 26 to complete the fluid connection. Thus, untreated water with solid waste can exit the at least one growth cell 3 through the at least one gravity-assisted drain 35 into the drain conduit 36. The untreated water then moves through the drain conduit 36 towards the filtration reservoir 37 where solid waste is removed from the untreated water. As a result, the treated water is moved into the pumping reservoir 26 so that the treated water can be moved back into the at least one growth cell 3.

As previously discussed, the drain system 34 is preferably implemented external to the at least one MCR 1. This can be done by utilizing the appropriate tubing or similar fluid mechanisms that connect the drain conduit 36 to the at least one gravity-assisted drain 35 and the filtration reservoir 37 to the pumping reservoir 26. However, in some embodiments, the filtration reservoir 37 is mounted within the pumping reservoir 26 so that the filtration reservoir 37 is in direct fluid communication with the pumping reservoir 26, as can be seen in FIGS. 1 through 10 and 13 through 20. For example, the filtration reservoir 37 can be implemented so that the top of the filtration reservoir 37 is open, which enables the treated water to flow out of the filtration reservoir 37 and into the pumping reservoir 26. In other embodiments, different fluid mechanisms can be implemented to enable the passive outflow of treated water from the filtration reservoir 37 into the pumping reservoir 26.

As can be seen in FIGS. 1 through 10 and 13 through 20, to help remove the solid waste from the untreated water flowing through the filtration reservoir 37, the drain system 34 may further comprise a solids removal device 38. The solids removal device 38 can be a rotary drum filter that allows the removal of solid waste from the untreated water without blocking the waterflow through the filtration reservoir 37. So, in general, the solids removal device 38 is mounted within the filtration reservoir 37 to secure the solids removal device 38 within the filtration reservoir 37. Further, the filtration reservoir 37 is in fluid communication with the drain conduit 36 via the solids removal device 38 so that the untreated water passes through the solids removal device 38 while flowing through the filtration reservoir 37. In other embodiments, different filtration mechanisms can be implemented that remove solid waste from the untreated waterflow.

While the at least one MCR 1 includes at least one growth cell 3, the present invention's system preferably includes at least one MCR 1 with a plurality of growth cells 6, as can be seen in FIGS. 1 through 10 and 13 through 20. Each of the plurality of growth cells 6 can be accommodated to retain different aquatic organisms so that all the aquatic organisms can grow simultaneously in the at least one aquaculture growth section 2. In addition, the at least one gravity-assisted drain 35 is also a plurality of gravity-assisted drains 39 so that each growth cell of the plurality of growth cells 6 has a corresponding gravity-assisted drain. Further, the plurality of growth cells 6 is distributed along the at least one aquaculture growth section 2 so that the several growth cells are evenly distributed throughout the at least one aquaculture growth section 2. Furthermore, each gravity-assisted drain of the plurality of growth cells 6 is integrated into the closed base of the corresponding growth cell of the plurality of growth cells 6. The untreated water from each growth cell can flow into the drain conduit 36 to maintain all the plurality of growth cells 6 in optimal conditions for the healthy growth of the retained aquatic organisms. Thus, a minority of the waterflow exiting the at least one aquaculture growth section 2 through force of gravity carries away most of the large solid waste from each of the plurality of growth cells 6. In other embodiments, the drain conduit 36 is not limited to being configured as an open channel; the drain conduit 36 can also be configured as a semi-closed or closed pipe.

As previously discussed, the waterflow inside each growth cell is preferably arranged to rotate counter to the rotational direction of each adjacent growth cell. This is achieved by guiding the flow of the treated water returning from the pumping reservoir 26 horizontally into the growth cell to drive counterclockwise or clockwise flow depending upon the rotational direction of adjacent cells of the water inside the growth cell. As can be seen in FIGS. 1 through 10 and 13 through 20, the water return system 30 may further comprise at least one fluid pump 31 and at least one water return manifold 32. The at least one fluid pump 31 helps move the treated water from the pumping reservoir 26 back into the at least one growth cell 3. The at least one water return manifold 32 guides the outflow of the returning treated water horizontally into the at least one growth cell 3.

In general, the at least one water return manifold 32 can be implemented as follows: the at least one water return manifold 32 is positioned adjacent to the cell opening 4 or along the lateral side so that the treated water flows into the corresponding growth cell, as can be seen in FIGS. 1 through 10 and 13 through 20. The at least one water return manifold 32 is also perimetrically connected to the at least one growth cell 3. In other words, the at least one water return manifold 32 is mounted onto a lateral wall of the at least one growth cell 3. The at least one water return manifold 32 is also oriented towards the water treatment section 14 or away from the water treatment section 14 depending on the lateral wall that the at least one water return manifold 32 is mounted on. This ensures that the waterflow within the at least one growth cell 3 rotates counterclockwise or clockwise depending upon how many growth cells are present and the rotational condition of adjacent cells. On the other hand, the at least one fluid pump 31 is mounted within the pumping reservoir 26 so that the at least one fluid pump 31 can move the treated water out of the pumping reservoir 26. Further, the at least one water return manifold 32 is in fluid communication with the pumping reservoir 26 via the at least one fluid pump 31. This way, as the treated water is pumped back into the at least one growth cell 3 through the at least one water return manifold 32, the water outflow is horizontal and close to the outer perimeter of the at least one growth cell 3. The waterflow within the at least one growth cell 3 is thus forced to rotate counterclockwise or clockwise depending upon rotation of adjacent cells to facilitate the flow of solid waste downstream towards the at least one gravity-assisted drain 35.

When several growth cells are implemented, the water return system 30 includes a plurality of water return manifolds 33 for the plurality of growth cells 6, as can be seen in FIGS. 1 through 10 and 13 through 20. Similar to the plurality of gravity-assisted drains 39, each water return manifold of the plurality of water return manifolds 33 is perimetrically connected to the corresponding growth cell of the plurality of growth cells 6. Thus, treated water is returned to all the plurality of growth cells 6 while ensuring that the waterflow within each growth cell rotates. The waterflow rotate within each growth cell about an axis oriented vertically above the corresponding gravity-assisted drain. Further, an arbitrary growth cell rotates in the opposite direction to the adjacent growth cells. In other words, a growth cell rotates clockwise, and the adjacent growth cells rotate counterclockwise. In other embodiments, different fluid mechanisms can be implemented to accomplish the counterclockwise and/or clockwise rotational waterflow within each of the plurality of growth cells 6.

As previously discussed, the first SBF reservoir 15 enables the removal of suspended particles and contaminants from the waterflow. As can be seen in FIGS. 1 through 10 and 13 through 20, the first SBF reservoir 15 may comprise a cell-to-SBF weir 16, an SBF-to-MBBR weir 17, a reservoir opening 18, and a reservoir floor 19. Like the at least one aquaculture growth section 2, the first SBF reservoir 15 is a rectangular structure with an open top. The cell-to-SBF weir 16 enables the flow of untreated water from the at least one growth cell 3 to the first SBF reservoir 15 via gravity. The SBF-to-MBBR weir 17 enables the flow of partially treated water from the first SBF reservoir 15 to the MBBR reservoir 23.

In general, the first SBF reservoir 15 can be implemented as follows: the cell-to-SBF weir 16 and the SBF-to-MBBR weir 17 are perimetrically distributed about the first SBF reservoir 15, as can be seen in FIGS. 1 through 10 and 13 through 20. The cell-to-SBF weir 16 is positioned adjacent to the at least one growth cell 3, while the SBF-to-MBBR weir 17 is positioned adjacent to the MBBR reservoir 23. Further, the cell-to-SBF weir 16 and the SBF-to-MBBR weir 17 is integrated into the reservoir opening 18 of the first SBF reservoir 15. In other words, the cell-to-SBF weir 16 is implemented on the wall between the first SBF reservoir 15 and the at least one growth cell 3, while the SBF-to-MBBR weir 17 is implemented on the wall between the first SBF reservoir 15 and the at least one growth cell 3. Further, the at least one growth cell 3 is in fluid communication with the first SBF reservoir 15 via the cell-to-SBF weir 16, while the first SBF reservoir 15 is in fluid communication with the MBBR reservoir 23 via the SBF-to-MBBR weir 17. The cell-to-SBF weir 16 is also in a gravitational-higher position than the SBF-to-MBBR weir 17 so that the waterflow moves from the at least one growth cell 3, through the first SBF reservoir 15, and into the MBBR reservoir 23. Further, the at least one aquaculture growth section 2 can be physically connected to the water treatment section 14. The at least one aquaculture growth section 2 can also be physically separated from the water treatment section 14, and the water treatment section 14 may be constructed from a different material from the at least one aquaculture growth section 2. In this case, several tubing, piping, or other appropriate fluid mechanisms can be utilized to connect the at least one growth cell 3 to the cell-to-SBF weir 16 so that untreated water from the at least one growth cell 3 can flow into the first SBF reservoir 15.

When a plurality of growth cells 6 are implemented in the at least one aquaculture growth section 2, the plurality of growth cells 6 is arranged so that a majority of the waterflow moving through the at least one aquaculture growth section 2 flows through a single growth cell before moving into the first SBF reservoir 15, as can be seen in FIGS. 1 through 10 and 13 through 20. In this embodiment, the plurality of growth cells 6 may comprise a first terminal cell 7 corresponding to the growth cell that is in direct fluid communication with the first SBF reservoir 15. So, the first terminal cell 7 is positioned adjacent to the water treatment section 14 while the rest of the growth cells are positioned opposite the water treatment section 14 across the first terminal cell 7. Further, each of the plurality of growth cells 6 is in fluid communication with each other so that waterflow can freely move through the at least one aquaculture growth section 2. Furthermore, the first terminal cell 7 is in fluid communication with the first SBF reservoir 15 via the cell-to-SBF weir 16. This way, the majority of the waterflow from the at least one aquaculture growth section 2 moves into the first SBF reservoir 15 through the first terminal cell 7.

As can be seen in FIGS. 1 through 10 and 13 through 20, the first SBF reservoir 15 can include different means to passively filtrate the untreated waterflow moving through the first SBF reservoir 15 from the at least one aquaculture growth section 2. In general, the first SBF reservoir 15 may further comprise a SBF baffle 20, a SBF media section 21, and a SBF media barrier 22. The SBF baffle 20 is a stationary element within the first SBF reservoir 15 that controls the incoming waterflow from the cell-to-SBF weir 16. The SBF media barrier 22 maintains the filtering media suspended within the first SBF reservoir 15. The SBF media section 21 corresponds to the area where the filtering media is present inside the first SBF reservoir 15. So, the SBF baffle 20 is mounted within the first SBF reservoir 15, adjacent to the cell-to-SBF weir 16, to force the incoming waterflow from the cell-to-SBF weir 16 towards the SBF media section 21. The SBF media barrier 22 is mounted within the first SBF reservoir 15, adjacent to the reservoir opening 18 of the first SBF reservoir 15. The SBF media barrier 22 can be positioned parallel to the reservoir floor 19 of the first SBF reservoir 15 to increase the area of the SBF media section 21. In addition, the SBF media section 21 is positioned in between the SBF media barrier 22 and the SBF baffle 20 and can be located above the SBF media barrier 22 for floating media or below the SBF media barrier 22 for neutral or sinking media. The filtration media in the SBF media section 21 filters particles of waste solids from the waterflow before the water upwells through the SBF media barrier 22 which is suspended below the operating level of the SBF water. This way, as the untreated water flows into the first SBF reservoir 15 through the cell-to-SBF weir 16, the untreated water is forced down into the SBF media section 21 by the SBF baffle 20. The waterflow then moves through the SBF media section 21 and passes through the SBF media barrier 22. Then, the partially treated water then moves towards the SBF-to-MBBR weir 17 so that the partially treated water moves into the MBBR reservoir 23.

In other embodiments, the first SBF reservoir 15 can alternatively be located downstream of the MBBR reservoir 23, as can be seen in FIG. 13 through 20. There are various advantages and disadvantages of placing the first SBF reservoir 15 in either location, and disadvantages could be minimized by implementing two SBF reservoirs before and after the MBBR reservoir 23. So, in this embodiment, the water treatment section 14 may further comprise a second SBF reservoir 27. The second SBF reservoir 27 corresponds to the SBF reservoir positioned in between the MBBR reservoir 23 and the pumping reservoir 26. The second SBF reservoir 27 can include the same filtration features as the first SBF reservoir 15. In addition, the second SBF reservoir 27 is implemented so that the waterflow through the water treatment section 14 is continuous and uninterrupted. So, the at least one aquaculture growth section 2, the first SBF reservoir 15, the MBBR reservoir 23, the second SBF reservoir 27, and the pumping reservoir 26 are in fluid communication with each other.

Like the first SBF reservoir 15, the second SBF reservoir 27 includes several weirs that allow the waterflow through the second SBF reservoir 27 via gravity. As can be seen in FIG. 13 through 20, the second SBF reservoir 27 may comprise a MBBR-to-SBF weir 28, an SBF-to-pump weir 29, a reservoir opening 18, and a reservoir floor 19. Like the weirs of the first SBF reservoir 15, the MBBR-to-SBF weir 28 and the SBF-to-pump weir 29 are perimetrically distributed about the second SBF reservoir 27. The MBBR-to-SBF weir 28 is positioned adjacent to the MBBR reservoir 23, while the SBF-to-pump weir 29 is positioned adjacent to the pumping reservoir 26. Further, the MBBR-to-SBF weir 28 and the SBF-to-pump weir 29 are integrated into the reservoir opening 18 of the second SBF reservoir 27 to enable the waterflow through the second SBF reservoir 27. This way, the MBBR reservoir 23 is in fluid communication with the second SBF reservoir 27 via the MBBR-to-SBF weir 28. The MBBR-to-SBF weir 28 is in a gravitational-lower position than the SBF-to-MBBR weir 17 so that waterflow moves from the first SBF reservoir 15, through the MBBR reservoir 23, and into the second SBF reservoir 27. Further, the second SBF reservoir 27 is in fluid communication with the pumping reservoir 26 via the SBF-to-pump weir 29. This way, the waterflow through the second SBF reservoir 27 can continue moving towards the pumping reservoir 26. In other embodiments, additional SBF reservoirs or different arrangements of the SBF reservoirs can be implemented in the water treatment section 14 as necessary.

Like the first SBF reservoir 15, the MBBR reservoir 23 is also preferably a rectangular subsection of the water treatment section 14 with an open top. As can be seen in FIG. 1 through 12, in general, the MBBR reservoir 23 comprises a MBBR-to-pump weir 24 and a reservoir opening 18. The MBBR-to-pump weir 24 corresponds to the weir that is implemented when the waterflow moves directly from the MBBR reservoir 23 to the pumping reservoir 26. Like the weirs of the first SBF reservoir 15, the MBBR-to-pump weir 24 is perimetrically distributed about the MBBR reservoir 23. The MBBR-to-pump weir 24 is also positioned adjacent to the pumping reservoir 26 and is integrated into the reservoir opening 18 of the MBBR reservoir 23. This allows waterflow from the MBBR reservoir 23 to the pumping reservoir 26. Furthermore, the pumping reservoir 26 is in fluid communication with the MBBR reservoir 23 via the MBBR-to-pump weir 24. The MBBR-to-pump weir 24 is in a gravitational-lower position than the SBF-to-MBBR weir 17 so that the waterflow through the water treatment section 14 is promoted via gravity. In other embodiments, different fluid mechanisms can be implemented to aid in the waterflow through the water treatment section 14.

As can be seen in FIG. 1 through 12, to further remove waste from the partially treated water flowing from the first SBF reservoir 15, the MBBR reservoir 23 may further comprise a plurality of surface aerators 25. The plurality of surface aerators 25 can include, but is not limited to, floating aerators, non-floating aerators, or a combination thereof. The plurality of surface aerators 25 is distributed throughout the MBBR reservoir 23 to maximize the action of the plurality of surface aerators 25 within the MBBR reservoir 23. Further, the plurality of surface aerators 25 is mounted within the MBBR reservoir 23 so that each surface aerator can remain on the surface as the waterflow moves through the MBB reservoir. This way, when the partially treated water enters the MBBR reservoir 23, the waterflow is thoroughly mixed with MBBR media by action of the plurality of surface aerators 25. The energetic mixing of the water, MBBR media, and atmospheric air serves to strip $CO2$ from the system water, add Oxygen (O2) to the waterflow until the water approaches atmospheric saturation, and allows bacteria on MBBR media to have superior contact with the ammonia dissolved in the water. Thus, the dissolved ammonia is changed to a non-harmful nitrogen form. Further, the vigorous mixing of the MBBR media caused by the plurality of surface aerators 25 everywhere also serves to scour the MBBR media on a continuous basis to minimize excessive biofilm accumulation on the MBBR media, which reduces the functionality of the MBBR reservoir 23 in general.

In the preferred embodiment, the number of the plurality of surface aerators 25 is selected based on the maximum amount of O2 needed in the present invention's system by the particular aquatic organism being cultured, density, and maximum system loading. Further, most of the O2 required for culturing the aquatic organism comes from the action of the plurality of surface aerators 25 and supplemental O2 is only supplied in times of emergency or high loading of the present invention's system. In addition, the water recirculation movement action of the plurality of surface aerators 25 acts to be the force which keeps the MBBR media in constant motion rather than using previous designs of air lifts or other means. The particular use of the plurality of surface aerators 25 and the movement of MBBR media created thereby eliminates one of the major problems with floating media where the media tends to climb out of the water column making this media unavailable for nitrification.

Due to the elongated design of the existing agricultural-style building, the at least one MCR 1 is designed as an elongated tank structure to match the elongated design of the existing agricultural-style building. As can be seen in FIGS. 1 through 10 and 13 through 20, to match the elongated shape of the at least one MCR 1, the plurality of growth cells 6 is preferably implemented in a linear arrangement. In this embodiment, the plurality of growth cells 6 comprises a first terminal cell 7, a second terminal cell 8, and a plurality of intermediate cells 9. The first terminal cell 7 preferably corresponds to the growth cell adjacent to the water treatment section 14, while the second terminal cell 8 corresponds to the opposite terminal growth cell. The plurality of intermediate cells 9 corresponds to the growth cells positioned between the first terminal cell 7 and the second terminal cell 8. So, in general, the plurality of growth cells 6 is distributed along the at least one aquaculture growth section 2 due to the elongated design of the at least one MCR 1. The first terminal cell 7 is positioned adjacent to the water treatment section 14, while the second terminal cell 8 is positioned opposite the first terminal cell 7 along the at least one aquaculture growth section 2. Furthermore, the plurality of intermediate cells 9 is positioned in between the first terminal cell 7 and the second terminal cell 8. As a result, the plurality of growth cells 6 is configured into a linear arrangement along the at least one aquaculture growth section 2.

Figure 1:
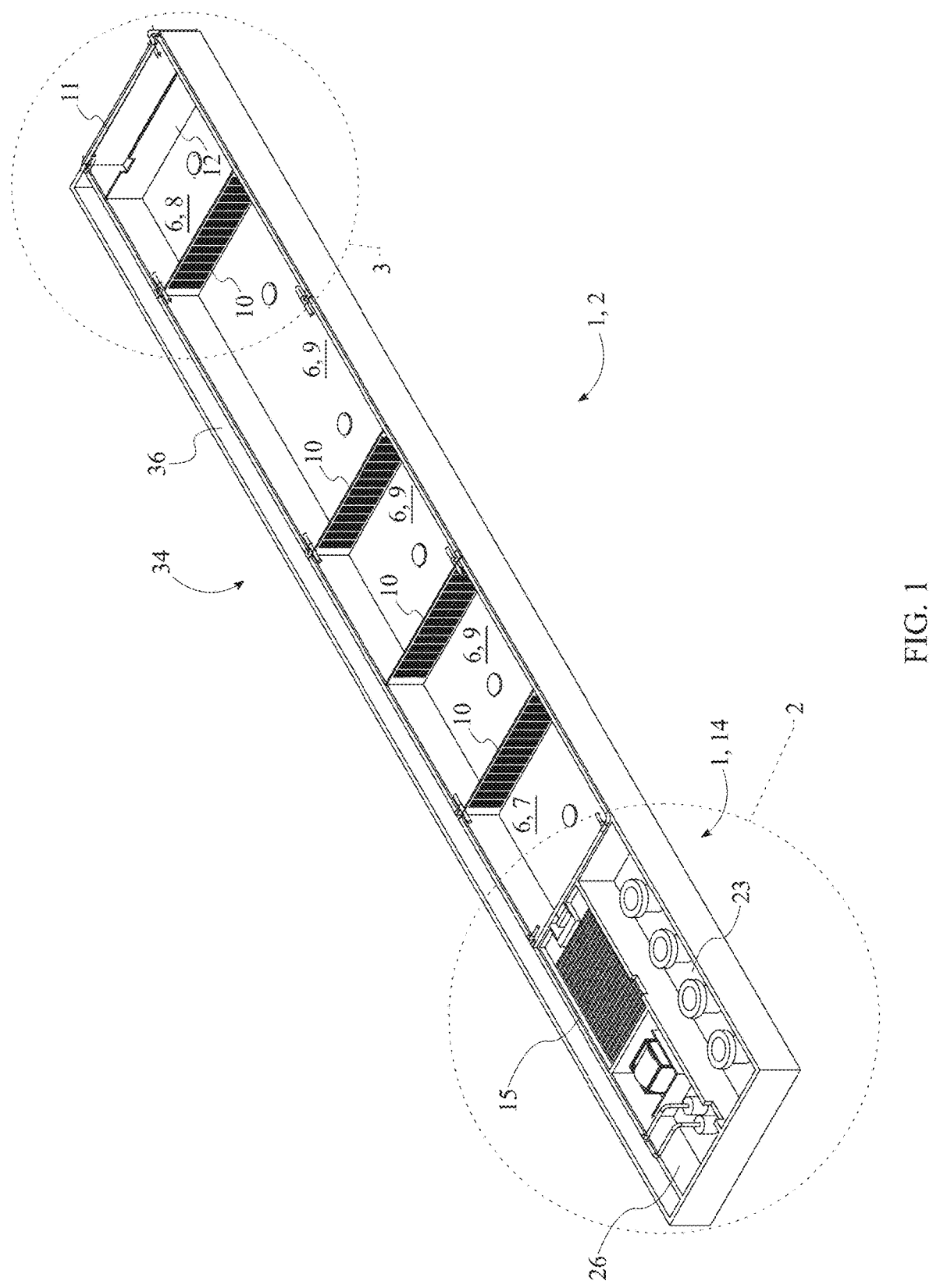
FIG. 1 is a top perspective view of the Mixed-Cell Raceway (MCR) of the system of the present invention, wherein the aquaculture growth section is shown with several dividing gates and a purging gate.
Figure 2:
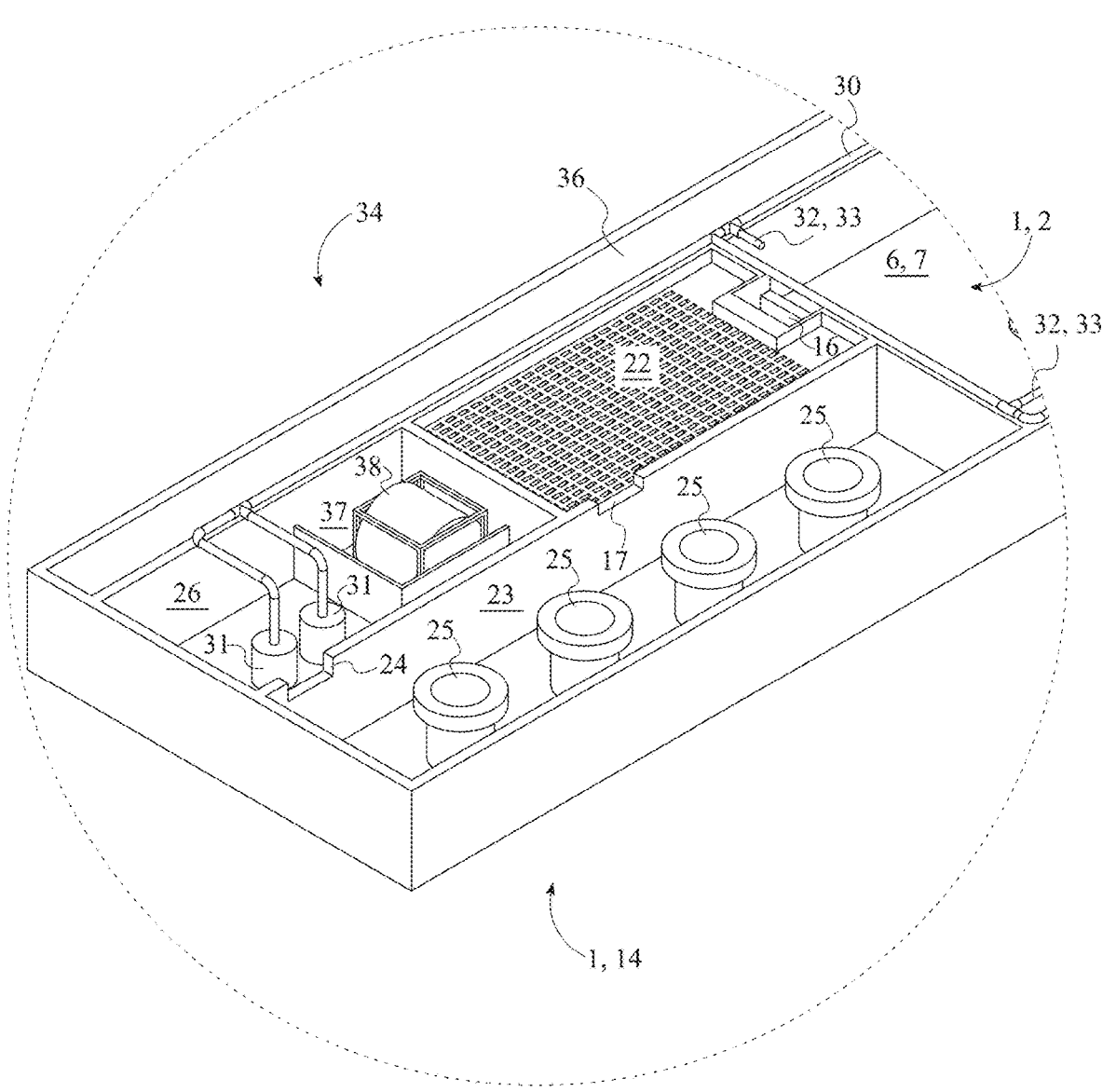
FIG. 2 is a magnified view of the water treatment section of the MCR of the present invention's system shown in FIG. 1.
Figure 3:
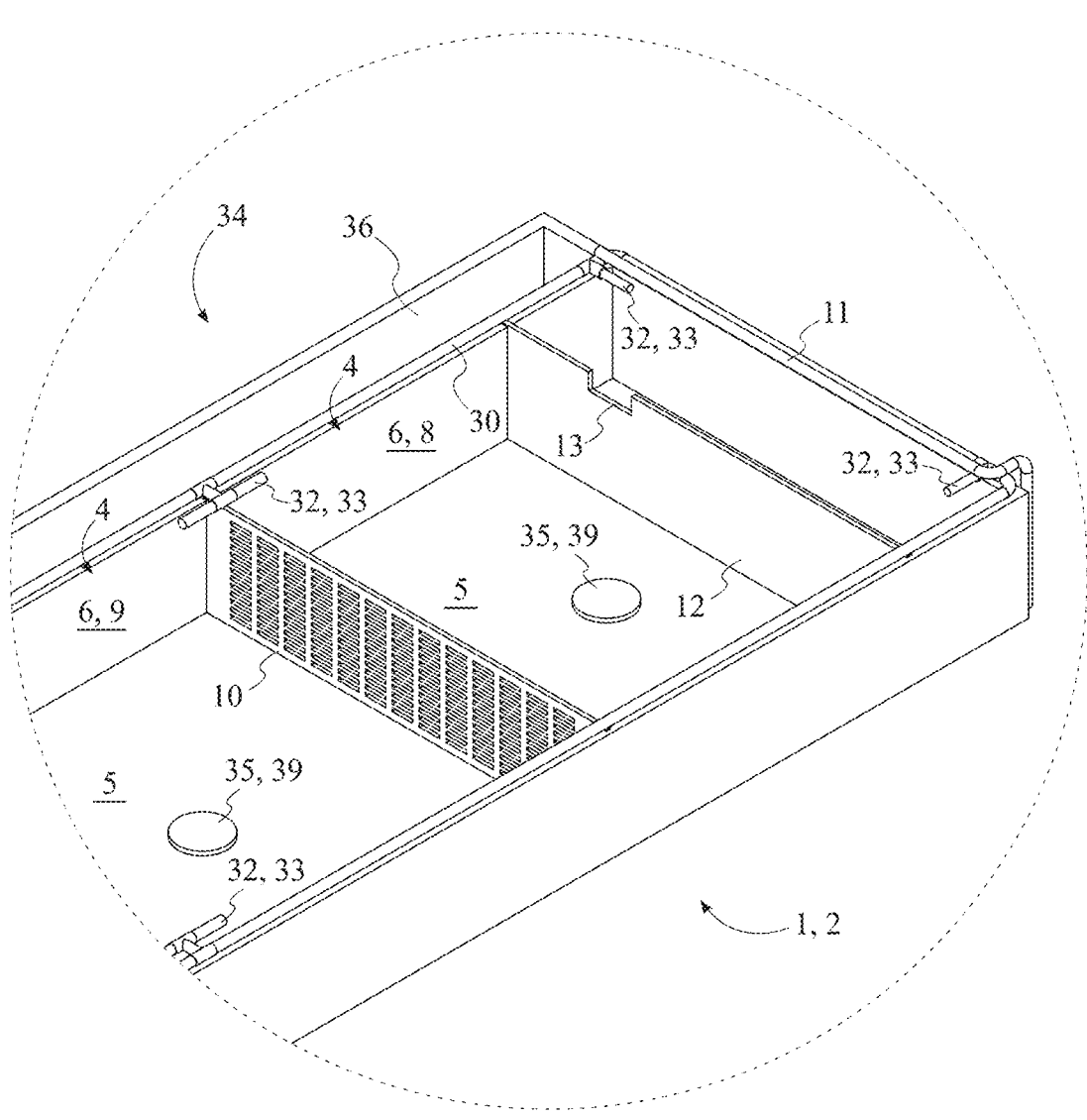
FIG. 3 is a magnified view of the aquaculture growth section of the MCR of the present invention's system shown in FIG. 1.
Figure 4:
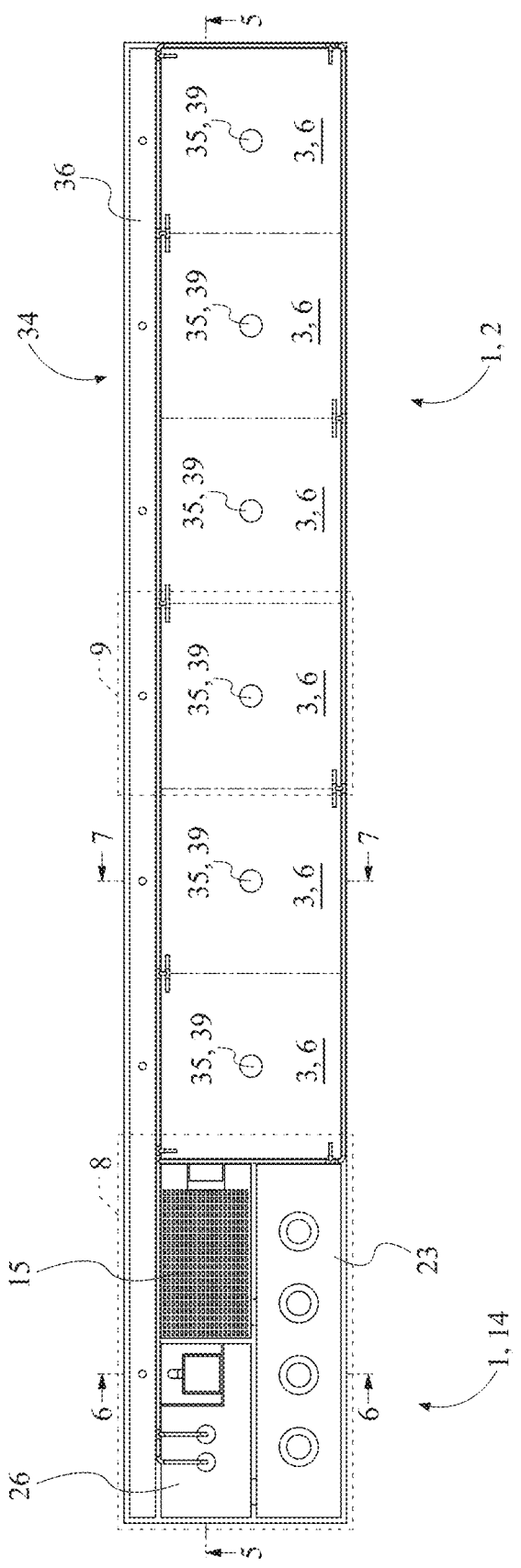
FIG. 4 is a top schematic view of the MCR of the present invention's system, wherein the aquaculture growth section is shown without the dividing gates nor the purging gate.
Figure 5:
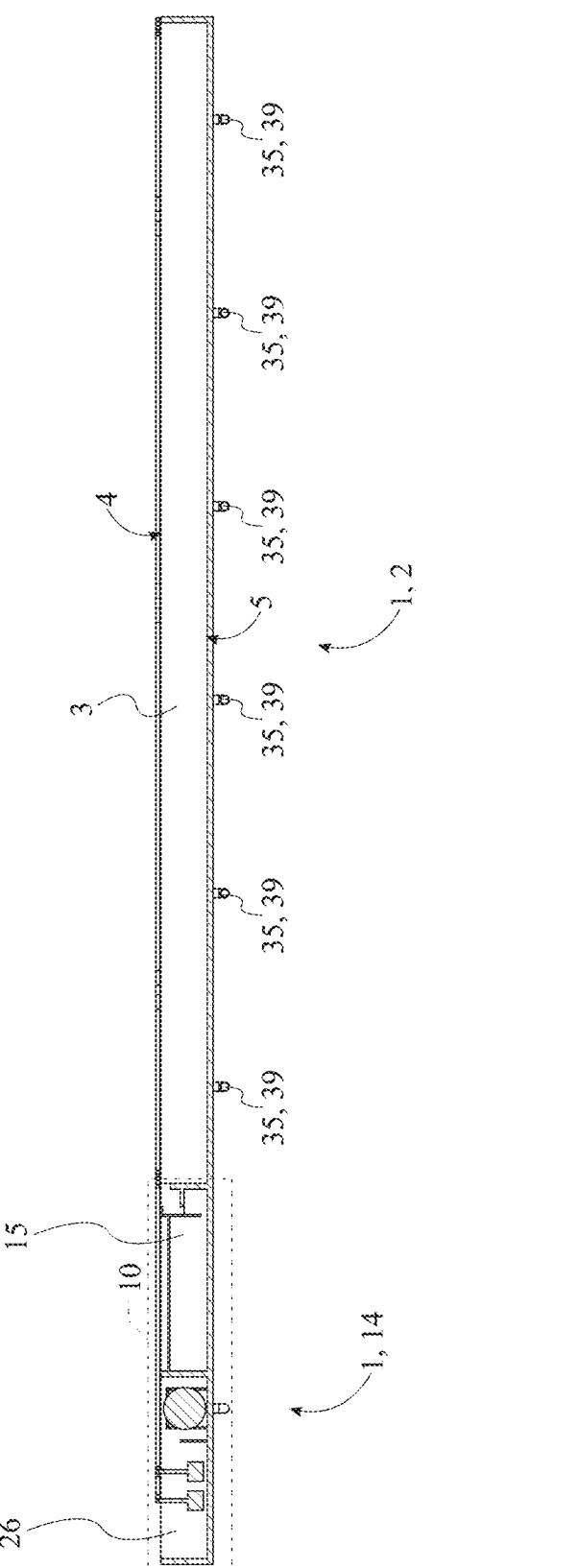
FIG. 5 is a vertical cross-sectional view of the MCR of the present invention's system taken along line 5-5 shown in FIG. 4.
Figure 6:
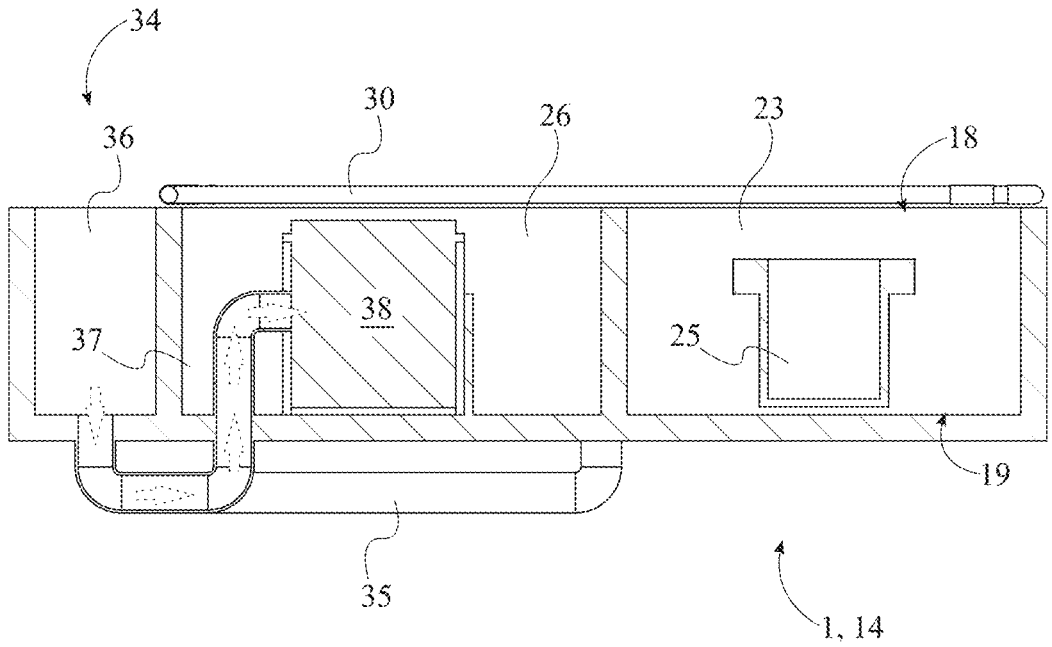
FIG. 6 is a vertical cross-sectional view of the MCR of the present invention's system taken along line 6-6 shown in FIG. 4.
Figure 7:
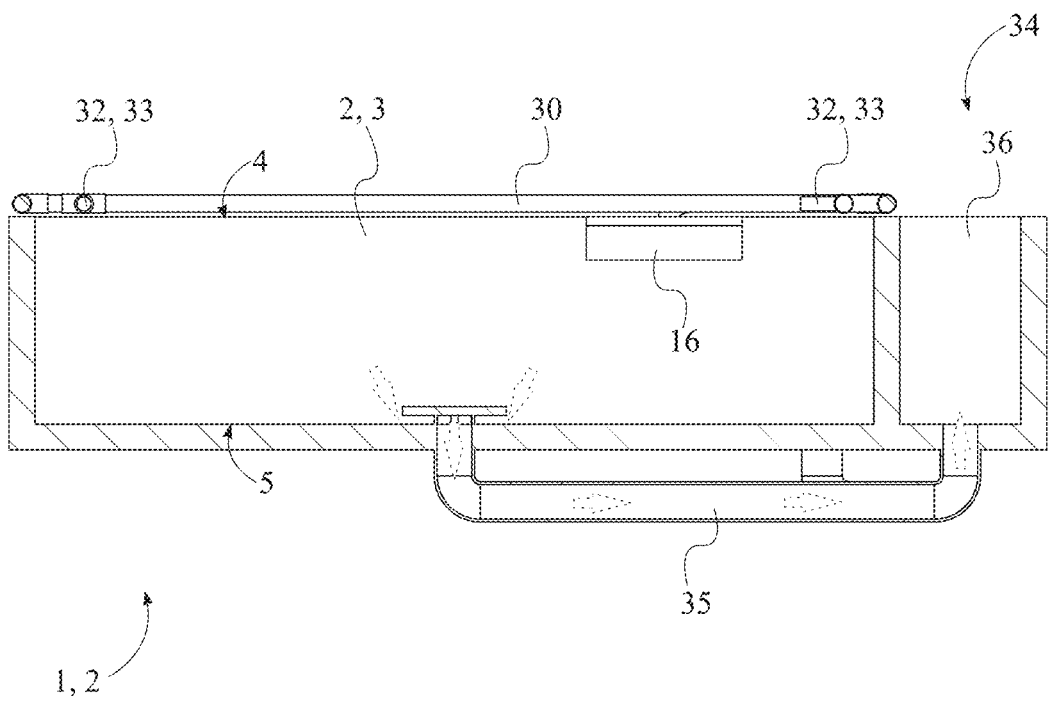
FIG. 7 is a vertical cross-sectional view of the MCR of the present invention's system taken along line 7-7 shown in FIG. 4.
Figure 8:
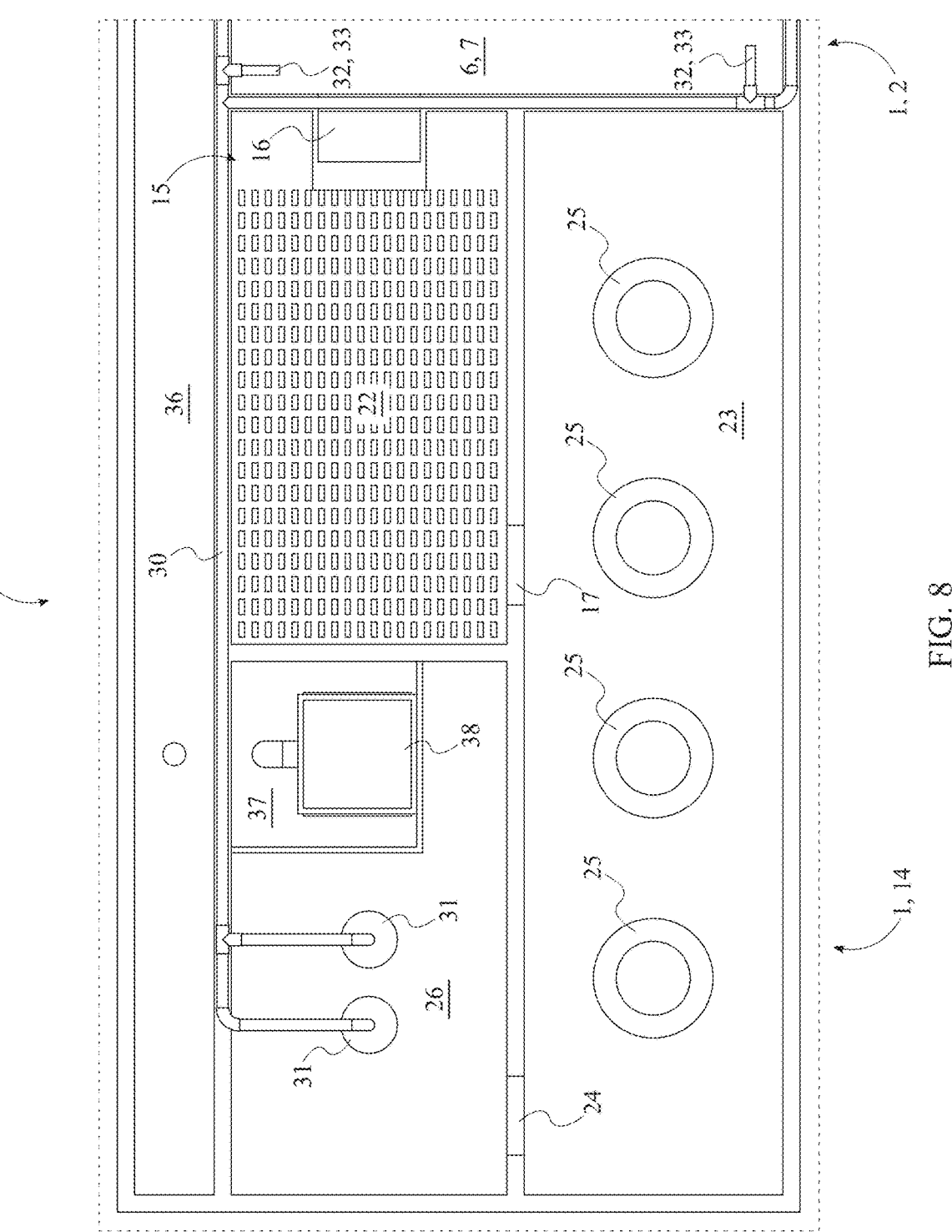
FIG. 8 is a magnified view of the water treatment section of the MCR of the present invention's system shown in FIG. 4.
Figure 9:
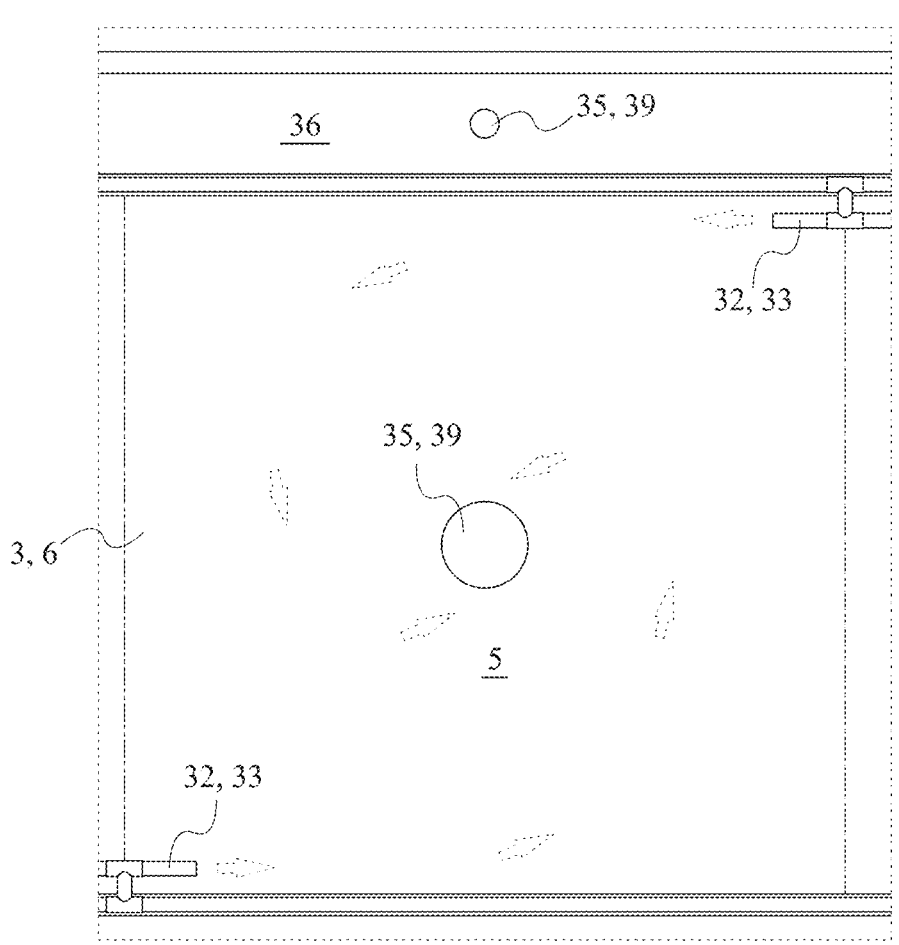
FIG. 9 is a magnified view of the aquaculture growth section of the MCR of the present invention's system shown in FIG. 4.
Figure 10:
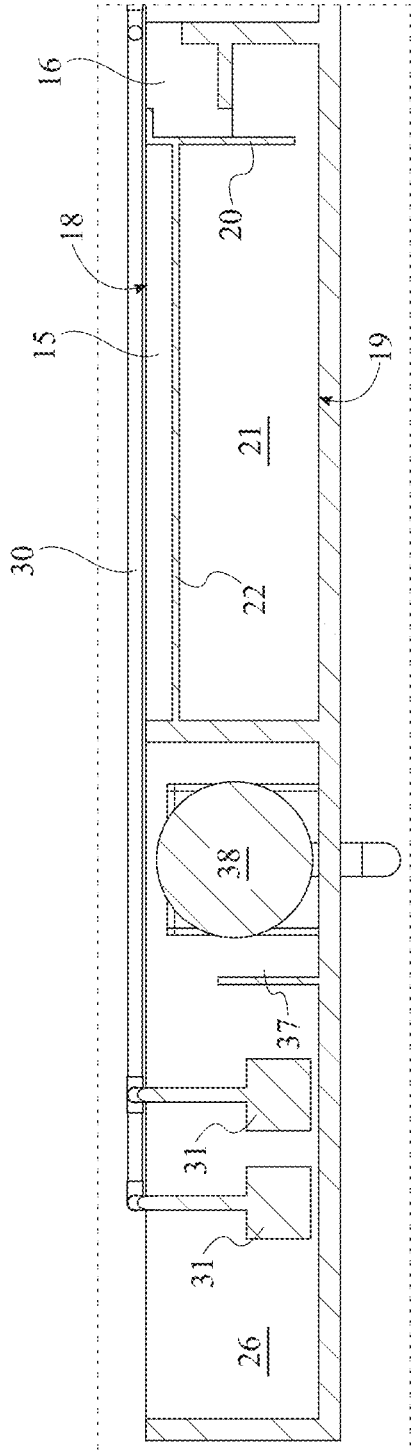
FIG. 10 is a magnified view of the water treatment section of the MCR of the present invention's system shown in FIG. 5.

This linear arrangement of the plurality of growth cells 6 allows the at least one aquaculture growth section 2 to retain groups of aquatic organisms separate from each other. For example, different cohort ages of fish or groups of fish can be kept separate from each other during the growing phase. As can be seen in FIG. 1 through 3, the at least one aquaculture growth section 2 may further comprise a plurality of dividing gates 10 that keep the various cohort ages of fish or groups of fish for no particular reason separated from each other. Each of the plurality of dividing gates 10 span a width of the at least one aquaculture growth section 2 to separate adjacent growth cells. Further, each of the plurality of dividing gates 10 can be selectively mounted within the at least one aquaculture growth section 2 to divide each of the growth cells. For example, a dividing gate of the plurality of dividing gates 10 can be positioned in between the first terminal cell 7 and an adjacent intermediate cell of the plurality of intermediate cells 9, which divides the first terminal cell 7 from the rest of the growth cells. Likewise, a dividing gate of the plurality of dividing gates 10 can be positioned in between the second terminal cell 8 and an adjacent intermediate cell of the plurality of intermediate cells 9 to divide the second terminal cell 8 from the rest of the growth cells. Further, a dividing gate of the plurality of dividing gates 10 can be positioned in between an arbitrary intermediate cell and an adjacent intermediate cell of the plurality of intermediate cells 9. This allows each intermediate cell from the adjacent intermediate cells to also be divided if necessary. Furthermore, each of the plurality of dividing gates 10 is slidably mounted within the at least one aquaculture growth section 2 so that each dividing gate can be moved, if necessary, without removing the selected dividing gate from the at least one aquaculture growth section 2.

As can be seen in FIG. 1 through 3, to allow waterflow throughout the at least one aquaculture growth section 2, each dividing gate of the plurality of dividing gates 10 is made of a water permeable material. This allows waterflow through the plurality of dividing gates 10 while retaining the desired aquatic organisms within the target growth cell. Further, each of the plurality of dividing gates 10 is designed to allow the managing of the growing aquatic organisms without overhandling. For example, the youngest and smallest fish in a cohort can be arranged to occupy a single growth cell using the corresponding dividing gates. After an appropriate time and amount of growth, these fish are moved to the unoccupied, adjacent growth cells via an opening in the corresponding dividing gates to allow additional growth. After a similar appropriate length of time, the same cohort of fish are allowed to pass through the remaining dividing gates via the corresponding openings to finish growing in the remaining unoccupied growth cells. Further, each of the plurality of dividing gates 10 can be fixed in place or be moved along the at least one aquaculture growth section 2 to encourage the fish to move into the adjoining growth cell when appropriate. These fish movements all happen without ever touching the fish, which reduces stress on the fish and promotes faster growth while reducing labor needed in the operation of the farm. Alternatively, the at least one aquaculture growth section 2 can be arranged to house a single cohort of fish without the use of the plurality of dividing gates 10.

In some embodiments, the at least one aquaculture growth section 2 may further comprise an inlet water manifold 11 and a purging gate 12, as can be seen in FIG. 1 through 3. The purging gate 12 is a minimally water permeable barrier that restricts new water released from the inlet water manifold 11 from mixing with recirculating system water. The purging gate 12 also allows a predetermined quantity of harvest-size fish to enter the new water area via a door in the purging gate 12 to be immersed only in new water. This reduces any off-flavors remaining in the harvest-size fish before the fish are harvested in a process called purging. The purging process flushes enzymes, off-flavor-producing bacteria, and other byproducts so that the harvest-ready fish are ready for market harvest. The purging process also keeps these fish separate from the fish that are still being actively grown. Furthermore, the purging gate 12 comprises an outlet weir 13 that allows the flow of fresh water to flow into the rest of the plurality of growth cells 6 via gravity.

As can be seen in FIG. 1 through 3, the purging gate 12 and the inlet water manifold 11 are preferably implemented as follows: the inlet water manifold 11 is positioned adjacent to the second terminal cell 8 so that fresh water flows into the present invention's system from the second terminal cell 8. In addition, the inlet water manifold 11 is mounted onto a cell opening 4 of the second terminal cell 8 to allow the flow of fresh water down into the second terminal cell 8. Further, like the plurality of dividing gates 10, the purging gate 12 spans a width of the at least one aquaculture growth section 2. In addition, the outlet weir 13 is positioned adjacent to the cell opening 4 of the second terminal cell 8 in a gravitational-higher position to allow flow of fresh water into the at least one aquaculture growth section 2 via gravity. The purging gate 12 is also slidably mounted within the second terminal cell 8, offset to the inlet water manifold 11, to allow the repositioning of the purging gate 12 without having to remove the purging gate 12 from the at least one aquaculture growth section 2. Furthermore, the second terminal cell 8 is in fluid communication with the plurality of intermediate cells 9 and the first terminal cell 7 via the outlet weir 13. In other embodiments, different fluid mechanisms can be implemented to allow the introduction of fresh water into the present invention's system.

Figure 14:
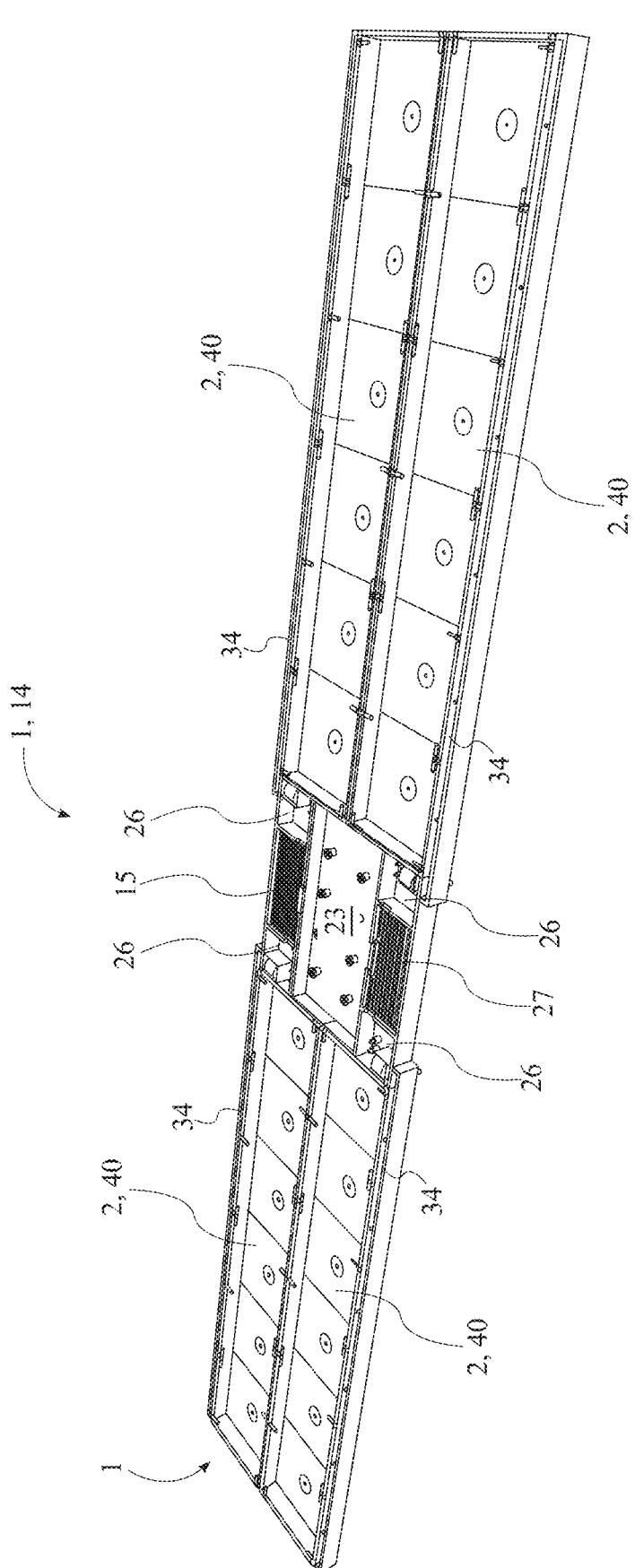
FIG. 14 is a top perspective view of an alternate embodiment of the MCR of the present invention's system, wherein the four aquaculture growth sections are shown connected to the water treatment section, and wherein multiple SBF reservoirs and several pump reservoirs are shown in the water treatment section.
Figure 15:
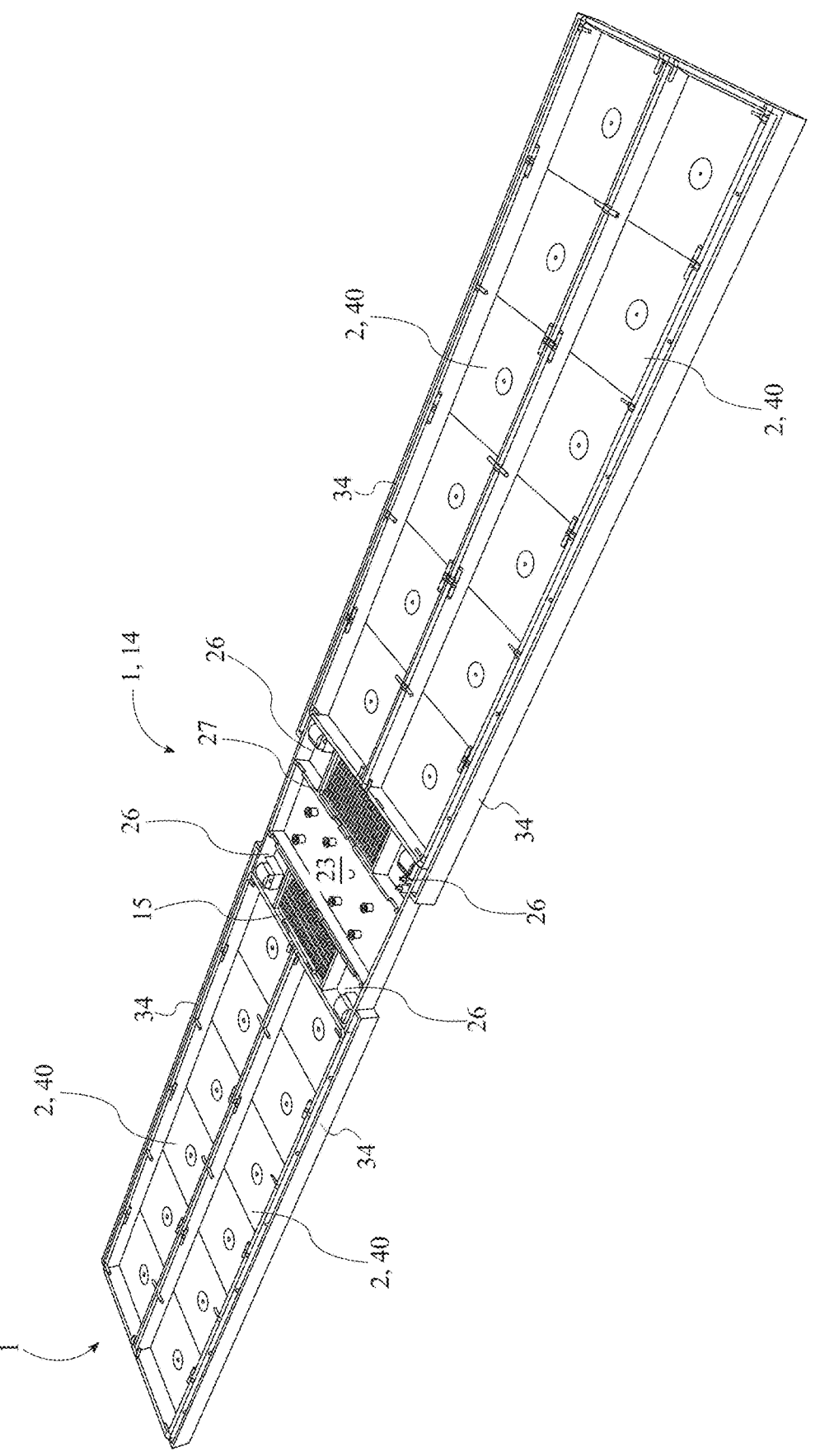
FIG. 15 is a top perspective view of an alternate embodiment of the MCR of the present invention's system, wherein the four aquaculture growth sections are shown connected to the water treatment section, and wherein multiple SBF reservoirs and several pump reservoirs are shown in the water treatment section.
Figure 16:
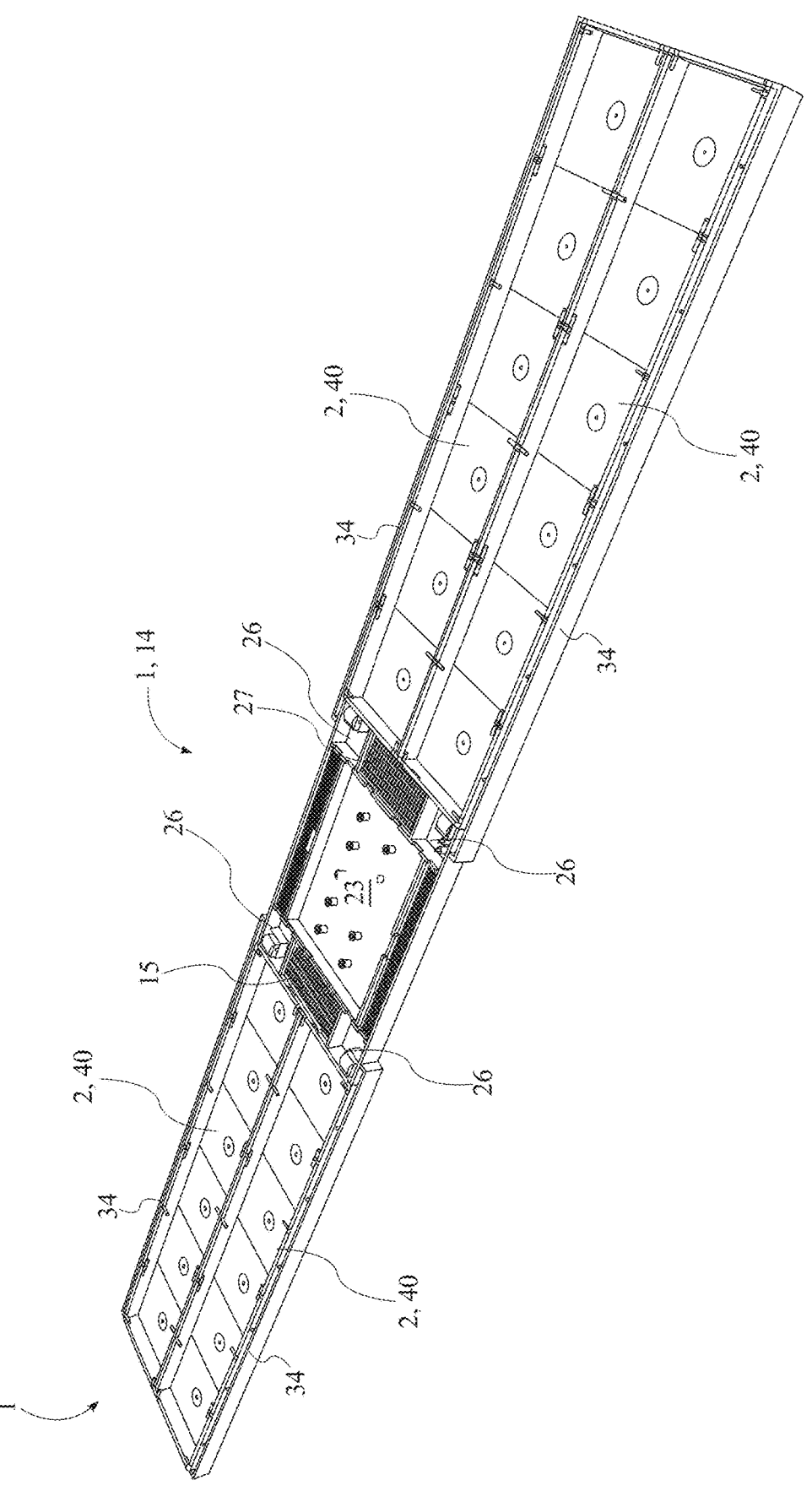
FIG. 16 is a top perspective view of an alternate embodiment of the MCR of the present invention's system, wherein the four aquaculture growth sections are shown connected to the water treatment section, and wherein several SBF reservoirs and several pump reservoirs are shown in the water treatment section.
Figure 17:
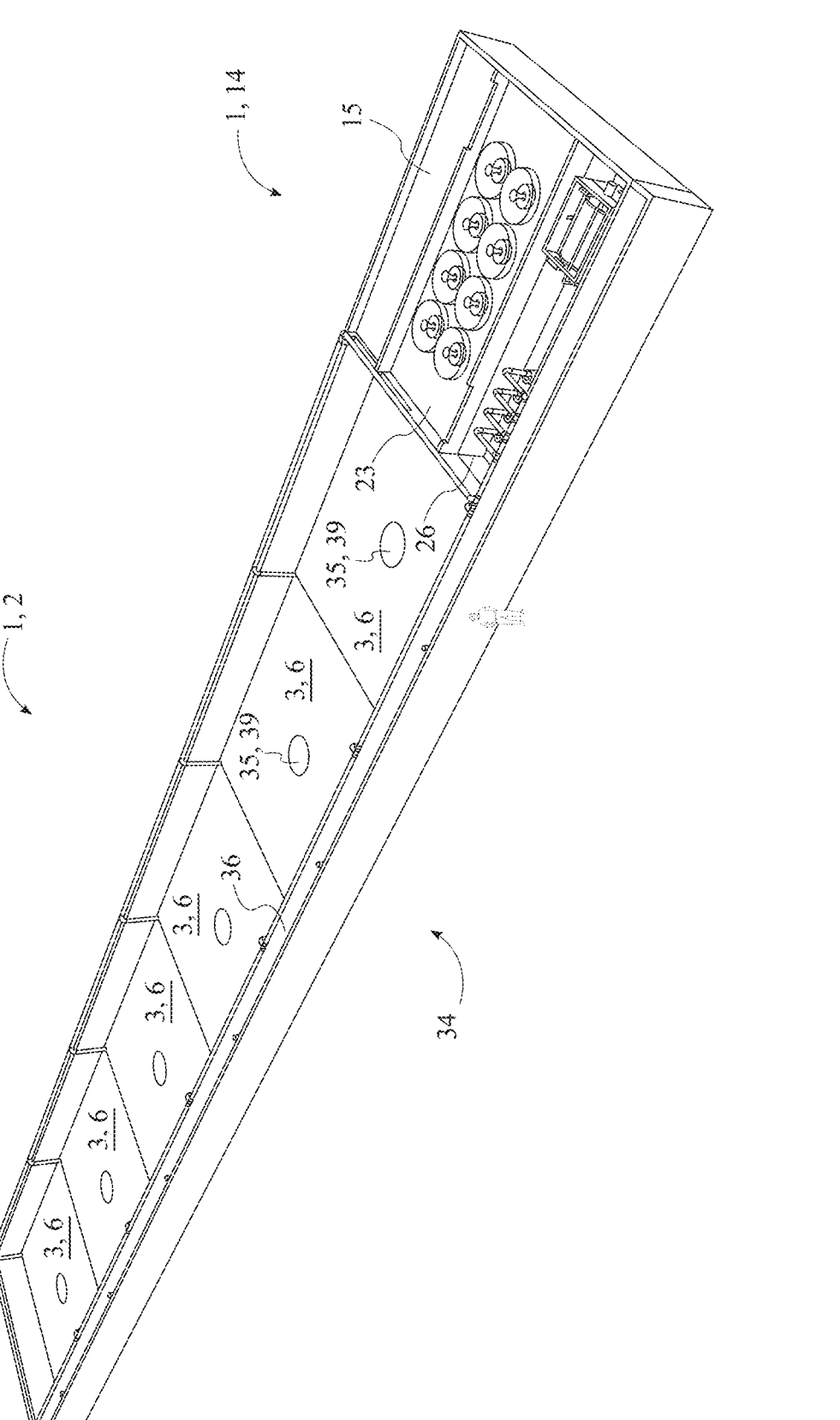
FIG. 17 is a top perspective view of the MCR of the present invention's system, wherein an alternate arrangement of the water treatment section is shown.
Figure 18:
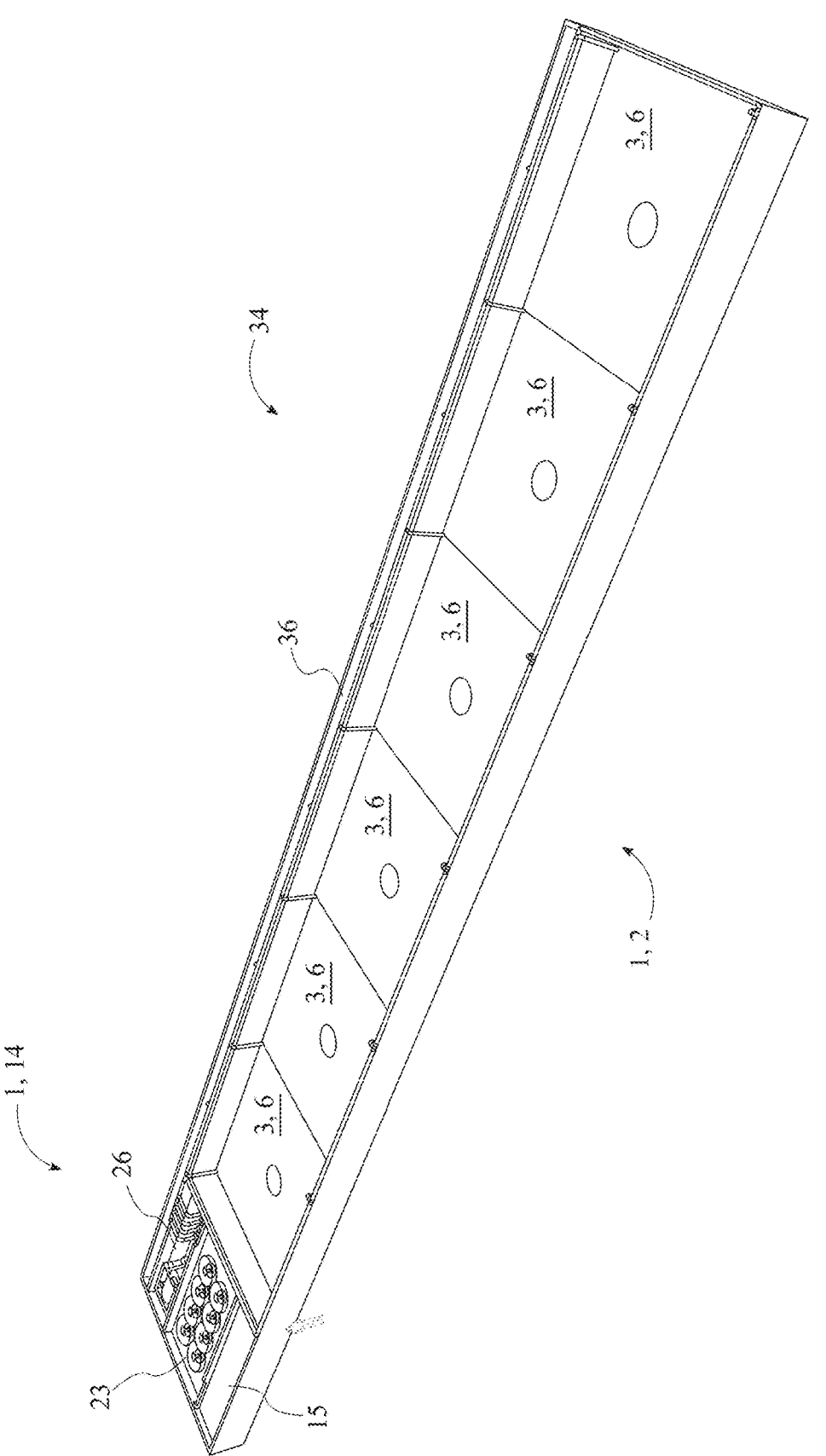
FIG. 18 is a top perspective view of the MCR of the present invention's system, wherein the alternate arrangement of the water treatment section is shown.
Figure 19:
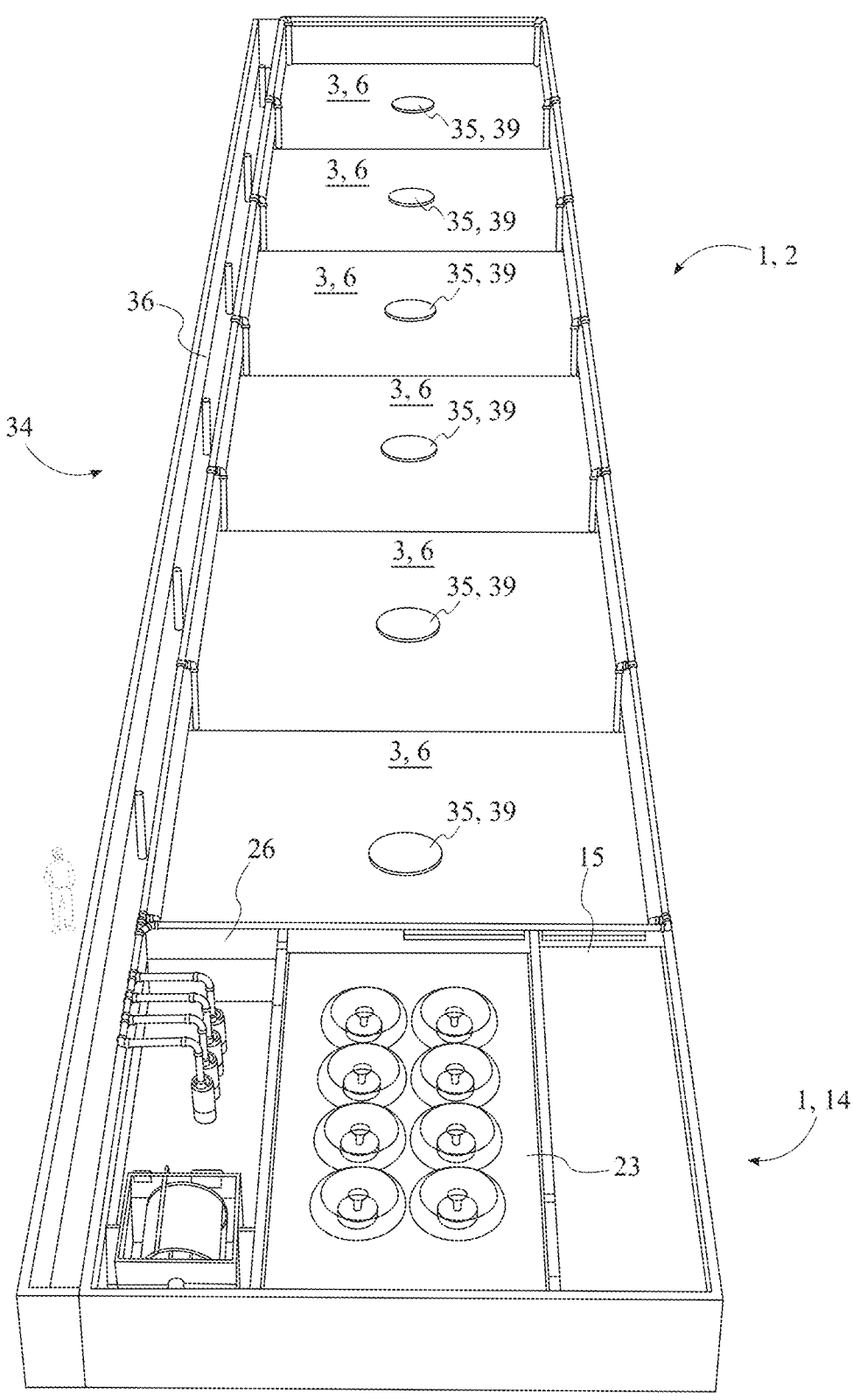
FIG. 19 is a top perspective view of the MCR of the present invention's system, wherein the alternate arrangement of the water treatment section is shown.
Figure 20:
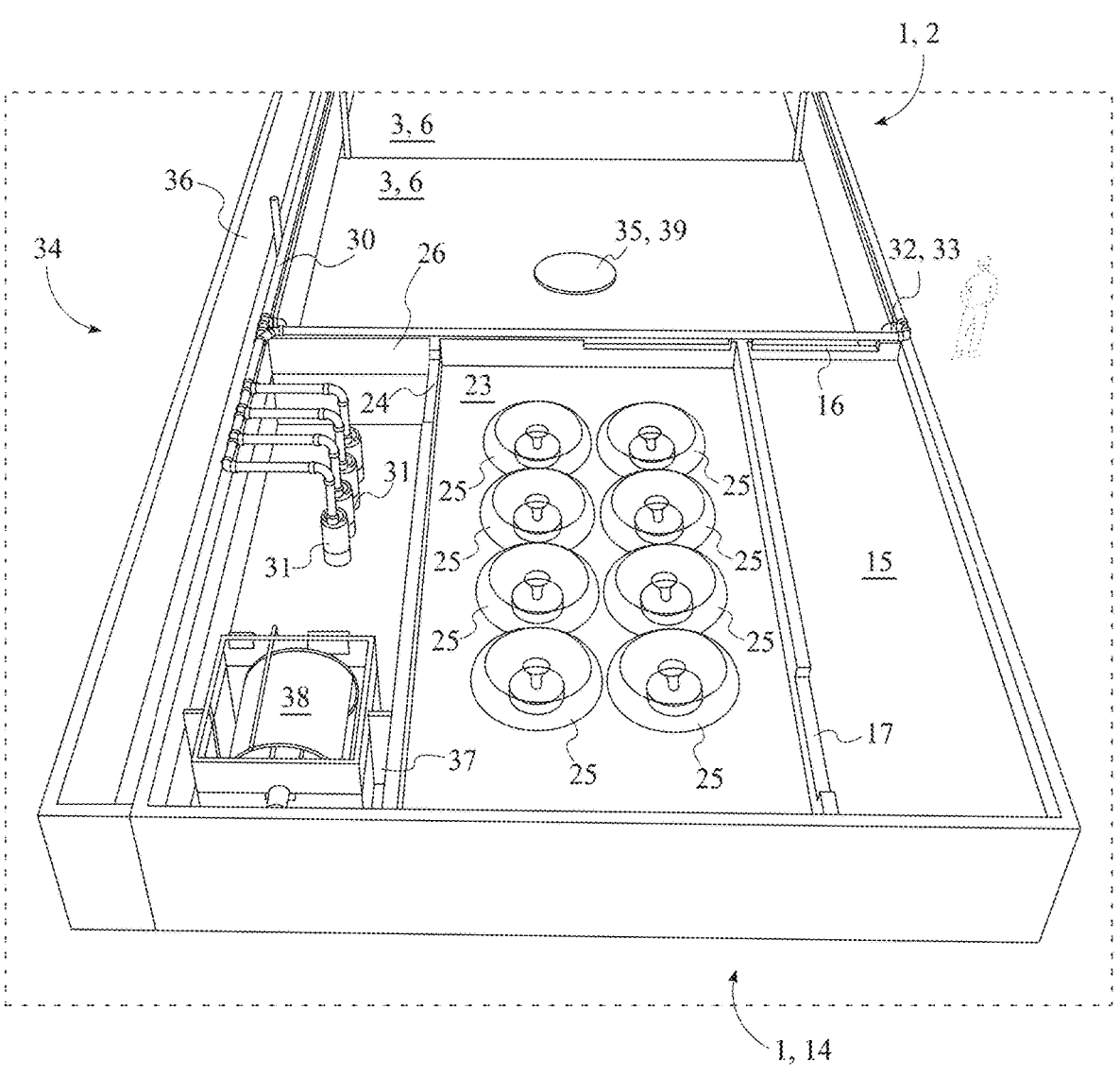
FIG. 20 is a magnified top perspective view of the alternate arrangement of the water treatment section of the present invention's system.

As previously discussed, the water treatment section 14 is preferably located at one end of the at least one MCR 1, as can be seen in FIG. 1 through 10. However, in some embodiments, the water treatment section 14 can be located at any position in the at least one MCR 1, as can be seen in FIG. 14 through 16. For example, the water treatment section 14 can be positioned among the plurality of growth cells 6 of the at least one aquaculture growth section 2. The particular chosen position can be decided based on the needs of the fish species, the specific husbandry process of the farming operation, and the specifics of the design of the existing barn. Further, the water treatment section 14s can be designed to treat water from different aquaculture growth sections. In this embodiment, the at least one MCR 1 can include a plurality of aquaculture growth sections 40, and each of the plurality of aquaculture growth sections 40 is in fluid communication with the water treatment section 14.

Figure 11:
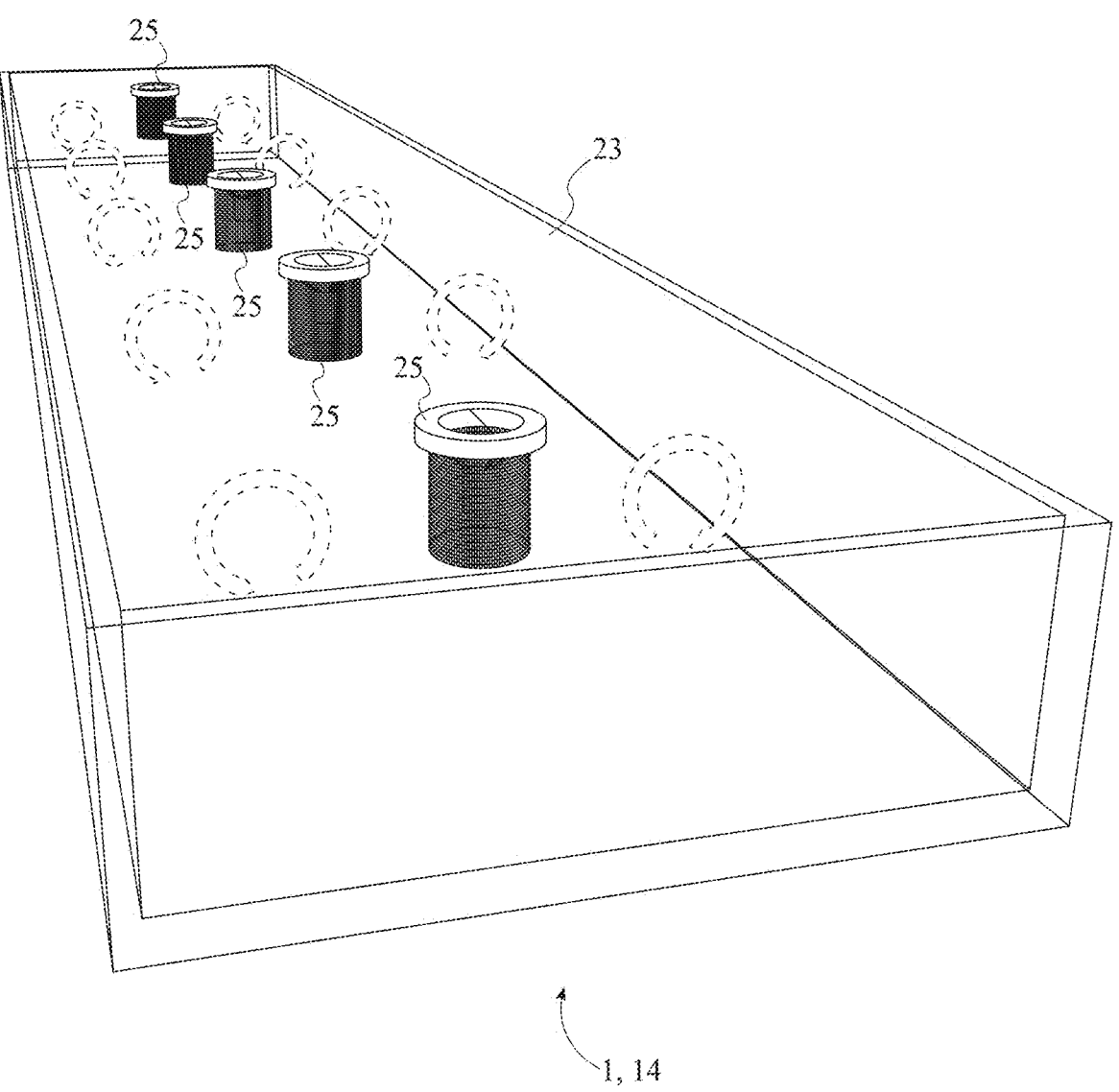
FIG. 11 is a top perspective view of the Moving Bed Biofilter Reactor (MBBR) reservoir of the present invention's system.
Figure 12:
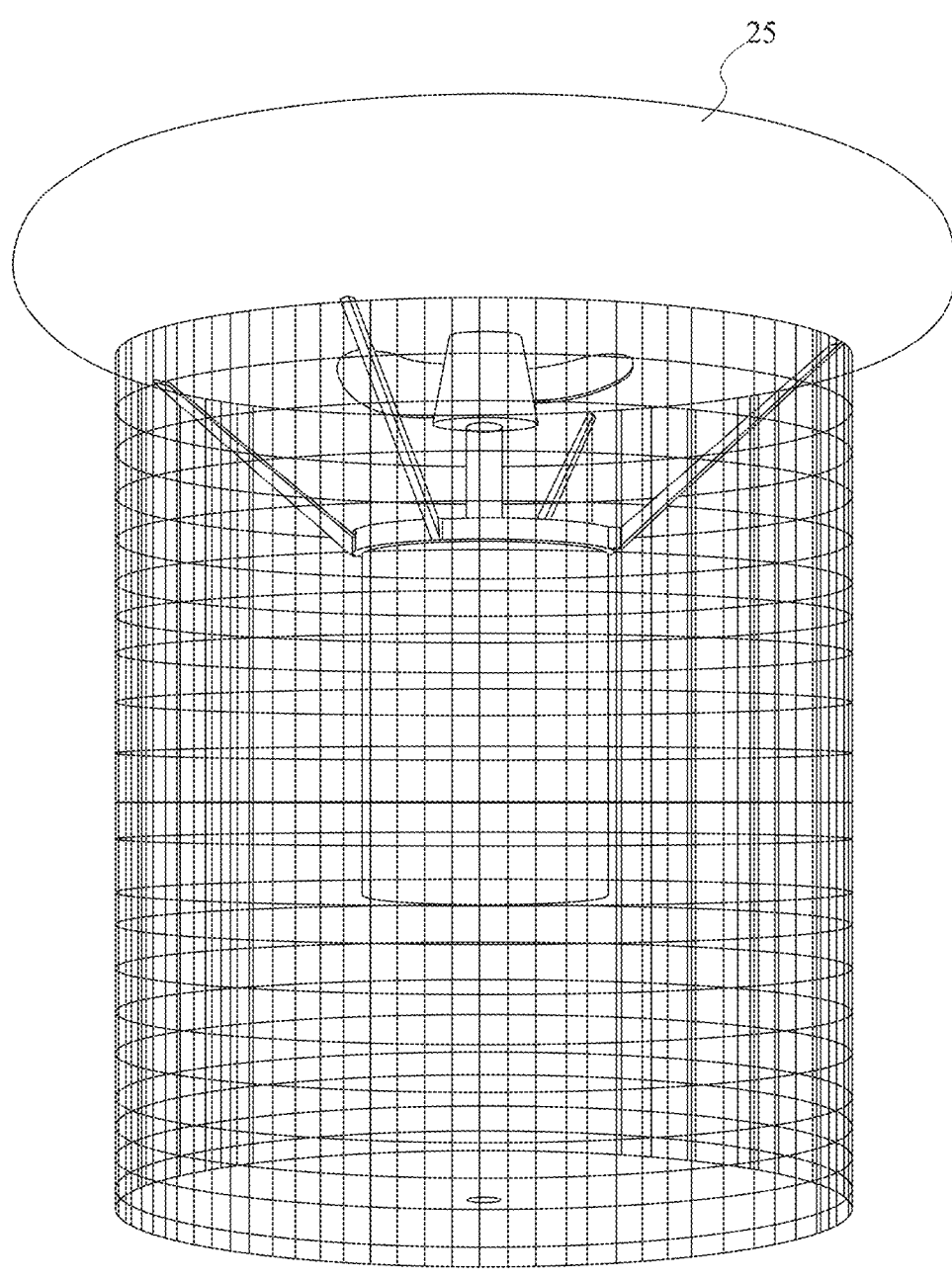
FIG. 12 is a front perspective view of a floating surface aerator of the MBBR reservoir of the present invention's system.
Figure 13:
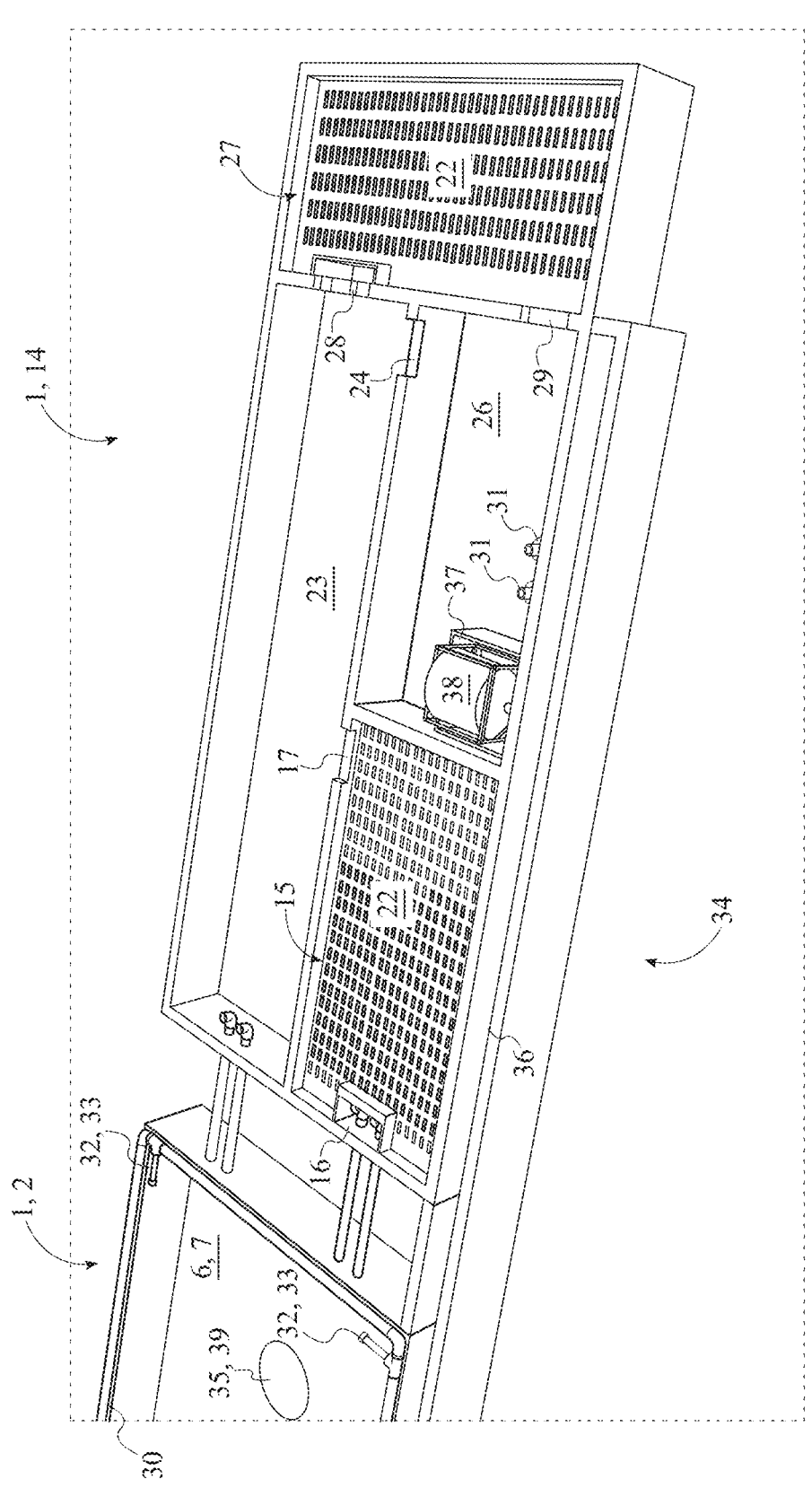
FIG. 13 is a magnified top perspective view of an alternate embodiment of the water treatment section of the present invention's system, wherein the water treatment section is shown with two Static Bed Filter (SBF) reservoirs.

While the system of the present invention is presented as a single integrated system, the different sections and subsystems can be implemented for separate related applications, as can be seen in FIGS. 11 and 12. For example, the plurality of surface aerators 25 can be implemented for other aquaculture applications that are not implemented using the entirety of the present invention's system. In this embodiment, the plurality of surface aerators 25 can be operatively coupled to an aquaculture growth section, wherein each of the plurality of surface aerators 25 is used to perform some or all of the functions of biofiltration, carbon dioxide ($CO_2$) stripping, oxygenation, and uniform mixing and circulation of biological media to minimize dead media zones by forcing downward flow to counterbalance the natural buoyancy of MBBR media. These functions of the plurality of surface aerators 25 are performed by the movement and aeration of system water caused by surface aerators located within the MBBR section of the specific aquaculture growth section screened contact with the media housing the treating bacteria.

Although the invention has been explained in relation to its preferred embodiment, it is to be understood that many other possible modifications and variations can be made without departing from the spirit and scope of the invention.

What is claimed is:

1. A recirculating aquaculture mixed-cell raceway system, the system comprising:
   at least one mixed-cell raceway;
   a drain system;
   the at least one mixed-cell raceway comprising at least one aquaculture growth section, a water treatment section, and a water return system;
   the water treatment section comprising a first static bed filter (SBF) reservoir, a moving bed biofilter reactor (MBBR) reservoir, and a pumping reservoir;
   the at least one aquaculture growth section being positioned adjacent to the water treatment section;
   the at least one aquaculture growth section and the water treatment section being positioned coplanar with each other;
   the at least one aquaculture growth section, the first SBF reservoir, the MBBR reservoir, and the pumping reservoir being in fluid communication with each other;
   the at least one aquaculture growth section being in fluid communication with the pumping reservoir via the drain system;
   the pumping reservoir being in fluid communication with the at least one aquaculture growth section via the water return system;
   the at least one aquaculture growth section comprising at least one growth cell;
   the at least one growth cell comprising a cell opening and a cell floor;
   the water return system comprising at least one fluid pump and at least one water return manifold;
   the at least one water return manifold being positioned adjacent to the cell opening;
   the at least one water return manifold being perimetrically connected to the at least one growth cell;
   the at least one fluid pump being mounted within the pumping reservoir; and
   the at least one water return manifold being in fluid communication with the pumping reservoir via the at least one fluid pump.

2. The system as claimed in claim 1 further comprising:
   the at least one aquaculture growth section comprising at least one growth cell;
   the at least one growth cell comprising a cell opening and a cell floor;
   the drain system comprising at least one gravity-assisted drain, a drain conduit, and a filtration reservoir;
   the drain conduit being positioned external to the at least one mixed-cell raceway;
   the at least one gravity-assisted drain being centered on the cell floor;
   the at least one gravity-assisted drain being integrated into the cell floor;
   the at least one gravity-assisted drain being in fluid communication with the filtration reservoir via the drain conduit; and
   the filtration reservoir being in fluid communication with the pumping reservoir.

3. The system as claimed in claim 2, wherein the filtration reservoir is mounted within the pumping reservoir.

4. The system as claimed in claim 2 further comprising:
the drain system further comprising a solids removal device;
the solids removal device being mounted within the filtration reservoir; and
the filtration reservoir being in fluid communication with the drain conduit via the solids removal device.

5. The system as claimed in claim 2 further comprising:
the at least one growth cell being a plurality of growth cells;
the at least one gravity-assisted drain being a plurality of gravity-assisted drains;
the plurality of growth cells being distributed along the at least one aquaculture growth section; and
each gravity-assisted drain of the plurality of growth cells being integrated into the closed base of the corresponding growth cell of the plurality of growth cells.

6. The system as claimed in claim 1 further comprising:
the at least one growth cell being a plurality of growth cells;
the at least one water return manifold being a plurality of water return manifolds;
the plurality of growth cells being distributed along the at least one aquaculture growth section; and
each water return manifold of the plurality of water return manifolds being perimetrically connected to the corresponding growth cell of the plurality of growth cells.

7. The system as claimed in claim 1 further comprising:
the at least one aquaculture growth section comprising at least one growth cell;
the first SBF reservoir comprising a cell-to-SBF weir, an SBF-to-MBBR weir, a reservoir opening, and a reservoir floor;
the cell-to-SBF weir and the SBF-to-MBBR weir being perimetrically distributed about the first SBF reservoir;
the cell-to-SBF weir being positioned adjacent to the at least one growth cell;
the SBF-to-MBBR weir being positioned adjacent to the MBBR reservoir;
the cell-to-SBF weir and the SBF-to-MBBR weir being integrated into the reservoir opening of the first SBF reservoir;
the at least one growth cell being in fluid communication with the first SBF reservoir via the cell-to-SBF weir; and
the first SBF reservoir being in fluid communication with the MBBR reservoir via the SBF-to-MBBR weir.

8. The system as claimed in claim 7 further comprising:
the at least one growth cell being a plurality of growth cells;
the plurality of growth cells comprising a first terminal cell;
the plurality of growth cells being distributed along the at least one aquaculture growth section;
the first terminal cell being positioned adjacent to the water treatment section;
each of the plurality of growth cells being in fluid communication with each other; and
the first terminal cell being in fluid communication with the first SBF reservoir via the cell-to-SBF weir.

9. The system as claimed in claim 7 further comprising:
the first SBF reservoir further comprising a SBF baffle, a SBF media section, and a SBF media barrier;
the SBF baffle being mounted within the first SBF reservoir, adjacent to the cell-to-SBF weir;

the SBF media barrier being mounted within the first SBF reservoir, adjacent to the reservoir opening of the first SBF reservoir; and
the SBF media section being positioned in between the SBF media barrier and the SBF baffle.

10. The system as claimed in claim 1 further comprising:
the water treatment section further comprising a second SBF reservoir; and
the at least one aquaculture growth section, the first SBF reservoir, the MBBR reservoir, the second SBF reservoir, and the pumping reservoir being in fluid communication with each other.

11. The system as claimed in claim 10 further comprising:
the second SBF reservoir comprising a MBBR-to-SBF weir, an SBF-to-pump weir, a reservoir opening, and a reservoir floor;
the MBBR-to-SBF weir and the SBF-to-pump weir being perimetrically distributed about the second SBF reservoir;
the MBBR-to-SBF weir being positioned adjacent to the MBBR reservoir;
the SBF-to-pump weir being positioned adjacent to the pumping reservoir;
the MBBR-to-SBF weir and the SBF-to-pump weir being integrated into the reservoir opening of the second SBF reservoir;
the MBBR reservoir being in fluid communication with the second SBF reservoir via the MBBR-to-SBF weir; and
the second SBF reservoir being in fluid communication with the pumping reservoir via the SBF-to-pump weir.

12. The system as claimed in claim 1 further comprising:
the MBBR reservoir comprising a MBBR-to-pump weir and a reservoir opening;
the MBBR-to-pump weir being perimetrically distributed about the MBBR reservoir;
the MBBR-to-pump weir being positioned adjacent to the pumping reservoir;
the MBBR-to-pump weir being integrated into the reservoir opening of the MBBR reservoir; and
the pumping reservoir being in fluid communication with the MBBR reservoir via the MBBR-to-pump weir.

13. The system as claimed in claim 1 further comprising:
the MBBR reservoir comprising a plurality of surface aerators;
the plurality of surface aerators being distributed throughout the MBBR reservoir; and
the plurality of surface aerators being mounted within the MBBR reservoir.

14. The system as claimed in claim 1 further comprising:
the at least one aquaculture growth section comprising a plurality of growth cells;
the plurality of growth cells comprising a first terminal cell, a second terminal cell, and a plurality of intermediate cells;
the plurality of growth cells being distributed along the at least one aquaculture growth section;
the first terminal cell being positioned adjacent to the water treatment section;
the second terminal cell being positioned opposite the first terminal cell along the at least one aquaculture growth section; and
the plurality of intermediate cells being positioned in between the first terminal cell and the second terminal cell;
the at least one aquaculture growth section further comprising a plurality of dividing gates;

each of the plurality of dividing gates spanning a width of the at least one aquaculture growth section;

a dividing gate of the plurality of dividing gates being positioned in between the first terminal cell and an adjacent intermediate cell of the plurality of intermediate cells;

a dividing gate of the plurality of dividing gates being positioned in between the second terminal cell and an adjacent intermediate cell of the plurality of intermediate cells;

a dividing gate of the plurality of dividing gates being positioned in between an arbitrary intermediate cell and an adjacent intermediate cell of the plurality of intermediate cells; and each of the plurality of dividing gates being slidably mounted within the at least one aquaculture growth section.

15. The system as claimed in claim 14, wherein each dividing gate of the plurality of dividing gates is made of a water permeable material.

16. The system as claimed in claim 14 further comprising:

the at least one aquaculture growth section further comprising an inlet water manifold and a purging gate;

the purging gate comprising an outlet weir;

the inlet water manifold being positioned adjacent to the second terminal cell;

the inlet water manifold being mounted onto a cell opening of the second terminal cell;

the purging gate spanning a width of the at least one aquaculture growth section;

the outlet weir being positioned adjacent to the cell opening of the second terminal cell;

the purging gate being slidably mounted within the second terminal cell, offset to the inlet water manifold; and the second terminal cell being in fluid communication with the plurality of intermediate cells and the first terminal cell via the outlet weir.

17. The system as claimed in claim 1 further comprising:

the at least one aquaculture growth section being a plurality of aquaculture growth sections; and each of the plurality of aquaculture growth sections being in fluid communication with the water treatment section.

18. A moving bed bio reactor (MBBR) system, the system comprising:

a water vessel;

one or more surface aerators;

a screening mechanism;

an amount of biological media; and wherein the screening mechanism is used to prevent the amount of biological media from entering the one or more surface aerators, and wherein the one or more surface aerators are used to perform some or all of the functions of biofiltration, carbon dioxide ($CO_2$) stripping, oxygenation, and uniform mixing and circulation of the amount of biological media to minimize dead media zones by forcing downward flow to counterbalance the natural buoyancy of MBBR media;

at least one aquaculture growth section comprising at least one growth cell;

at least one growth cell comprising a cell opening and a cell floor;

a water return system comprising at least one fluid pump and at least one water return manifold;

the at least one water return manifold being positioned adjacent to the cell opening;

the at least one water return manifold being perimetrically connected to the at least one growth cell;

the at least one fluid pump being mounted within a pumping reservoir; and the at least one water return manifold being in fluid communication with the pumping reservoir via the at least one fluid pump.

* * * * *